(12) United States Patent
Scholl et al.

(10) Patent No.: US 7,788,239 B2
(45) Date of Patent: Aug. 31, 2010

(54) METHOD FOR ACCESSING A DATA ENTITY AND ITS VERSIONS

(75) Inventors: Martin Scholl, Marburg (DE); Marcus Brindoepke, Marburg (DE); Otto Roth, Kirchhain (DE); Michael Preusse, Marburg (DE)

(73) Assignee: global infinipool GmbH, Marburg (DE)

( * ) Notice: Subject to any disclaimer, the term of this patent is extended or adjusted under 35 U.S.C. 154(b) by 339 days.

(21) Appl. No.: 11/975,944

(22) Filed: Oct. 23, 2007

(65) Prior Publication Data

US 2009/0094296 A1 Apr. 9, 2009

(30) Foreign Application Priority Data

Oct. 4, 2007 (WO) ............... PCT/EP2007/060544

(51) Int. Cl.
*G06F 7/00* (2006.01)

(52) U.S. Cl. .................. 707/695; 707/697; 707/699; 711/105; 711/121; 711/122

(58) Field of Classification Search ............ 707/203, 707/204, 695, 697, 699; 717/122, 121, 105
See application file for complete search history.

(56) References Cited

U.S. PATENT DOCUMENTS

| | | | | |
|---|---|---|---|---|
| 4,951,192 | A * | 8/1990 | Chase et al. ............... | 717/149 |
| 5,278,979 | A * | 1/1994 | Foster et al. .............. | 707/203 |
| 5,574,898 | A * | 11/1996 | Leblang et al. ............. | 707/1 |
| 5,649,200 | A * | 7/1997 | Leblang et al. ............ | 707/203 |
| 5,675,802 | A * | 10/1997 | Allen et al. .............. | 717/103 |
| 5,734,899 | A * | 3/1998 | Yoshizawa et al. .......... | 707/203 |
| 6,216,140 | B1 * | 4/2001 | Kramer ................ | 715/234 |
| 6,374,250 | B2 * | 4/2002 | Ajtai et al. .............. | 707/101 |
| 6,434,681 | B1 | 8/2002 | Armangau | |
| 7,322,025 | B2 * | 1/2008 | Reddy et al. ............. | 717/121 |
| 2004/0103393 | A1 * | 5/2004 | Reddy et al. ............. | 717/122 |
| 2005/0091291 | A1 * | 4/2005 | Kaler et al. .............. | 707/203 |
| 2006/0168565 | A1 * | 7/2006 | Gamma et al. ............. | 717/122 |
| 2009/0193094 | A1 | 7/2009 | Scholl et al. | |

OTHER PUBLICATIONS

Michael Blair Jones—"Transparently Interposing User Code at the System Interface"—Sep. 1992, CMU-CS-92-170, Secure Internet Programming, 1999—Springer, Citeseer, (pp. 1-150).*

Ronald A. Spencer—"Analysis of Performance resulting from the Design of Selected Hand-Held Input Control Devices and Visual Displays"—Aug. 2000 Blacksburg Virginia—scholar.lib.vt.edu (pp. 1-95).*

(Continued)

*Primary Examiner*—John E Breene
*Assistant Examiner*—Anh Ly
(74) *Attorney, Agent, or Firm*—Renner, Otto, Boisselle & Sklar, LLP

(57) ABSTRACT

A method provides access to a data entity having a basis version and the creation of derived versions. The method includes a creating procedure for creating a derived version, by carrying out one or more operations on the basis version, storing them, and accepting them. The method further includes a providing procedure for providing access to the derived version through first addresses mapped to second addresses of the basis version and of the accepted one or more operations, by reconstructing the derived version based on the basis version and the accepted one or more operations.

23 Claims, 16 Drawing Sheets

OTHER PUBLICATIONS

Green et al.—"Update Exchange with Mappings and Provenance"—Very Large Data Bases, Proceedings of the 33$^{rd}$ International Conference on Very Large data Bases, VLDB' 07, Sep. 23-28, 2007, Vienna, Austria (pp. 675-686).*

Muniswamy-Reddy et al., "A Versatile and User-Oriented Versioning File System", Proceedings of the Third USENIX Conference on File and Storage Technologies (FAST 2004), 14 pages.

Soules et al., "Metadata Efficiency in Versioning File Systems", Conference on File and Storage Technologies, San Francisco, CA, Mar. 31-Apr. 2, 2003, pp. 1-16.

Romain Robbes, "Mining a Change-Based Software Repository", Fourth International Workshop on Mining Software Repositories (MSR'07), IEEE, May 2007, XP002463368, 8 pages.

Reidar Conradi et al., "Version Models for Software Configuration Management", ACM Computing Surveys, 1998, XP002463369, pp. 1-60.

Wang et al., "Strider: a black-box, state-based approach to change and configuration management and support", Science of Computer Programming, Elsevier Science Publishers BV, Amsterdam, NL, vol. 53, No. 2, Nov. 2004, pp. 143-164, XP004566810.

Van Der Hoek et al., "A Testbed for Configuration Management Policy Programming", IEEE Transactions on Software Engineering, New York, NY, vol. 28, No. 1, Jan. 2002, pp. 79-99, XP011094031.

Search Report and Written Opinion of the International Searching Authority mailed Feb. 15, 2008 from corresponding International Application No. PCT/EP2007/060544.

* cited by examiner

METHOD FOR ACCESSING A DATA ENTITY AND ITS VERSIONS

FIELD OF THE INVENTION

The present invention relates to a method for providing access to a data entity, and for enabling the creation of derived versions of the data entity, and to a computer program for carrying out such method. It also relates to an apparatus configured for providing access to a data entity, and for enabling the creation of derived versions of the data entity.

BACKGROUND OF THE INVENTION

In computer technology, the virtualization refers to the abstraction of computer resources. The virtualization may take several forms. In one form, the virtualization consists in presenting to some users or computer systems a plurality of computer resources, for instance a plurality of physical computer resources, in such a manner that the plurality of resources are perceived by the users or computer systems as one single computer resource, for instance one single physical computer resource. In another form, the virtualization consists in presenting to some users or computer systems a single computer resource, for instance a physical computer resource, in such a manner that the resource is perceived by the users or computer systems as a plurality of computer resources, for instance a plurality of physical resources. In yet another form, the virtualization consists in presenting to some users or computer systems a computer resource in such a manner that the resource is perceived by the users or computer systems as having properties which differ from its actual properties.

The purposes of virtualization in computer technology include, but are not limited to, the presentation of a complex computer system or resource to some users or computer systems as a simpler system or resource for easing the access by the users or computer systems to the system or resource; the presentation of a large computer system or resource to some users or computer systems as a series of small, isolated systems and resources for privacy and security reasons; and the presentation of a computer system or resource offering a first external interface as a system or resource offering a second external interface, different from the first interface for easing the interfacing with the system or resource.

In this context, the action of presenting to users or computer systems means operating an interface between one or more physical computer resources and the users or computer systems in such a manner that some physical properties or characteristics of the one or more physical computer resources, including their numbers, are hidden or viewed as altered.

A computer resource may be a hardware device, such as a server computer or a data storage device, or a software device, such as an operating system, an application configured for running on a computer or a middleware application.

One way to implement and operate the virtualization of a single physical computer resource such as a computer is to execute a virtualization control program on the single physical computer resource. The virtualization control program is referred to here as host software. The host software creates on the single physical computer resource a complete, simulated computer environment for guest software. The guest software, which may for instance be a complete operating system, runs as it was a complete standalone computer environment running on a hardware platform in such a manner that the users accessing the guest software have the perception that only said guest software runs on the hardware platform.

In comparison to a conventional software application, the software application which operates as guest software may or may not be modified to be enabled to run as guest software on the host software. The hardware on which the host and guest software applications run may also be modified to allow the virtualization.

A platform virtualization, for instance an operating system virtualization, is generally performed by partitioning the memory disk of the single physical computer resource. That is, the host software partitions the memory disk of the single physical computer resource so that each guest software instance has a reserved portion of the resource's memory.

Partitioning a memory disk such as a hardware disk may lead to the formation of "images" of the same original data entities on the memory disk. In other words, several copies of the same original data entities are copied on different, separate partitions of the memory disk. This is caused by the use of a plurality of guest software applications on the host software.

Such partitioning of a memory disk for supporting virtualization has disadvantages. The memory space needed to save the data relating to each guest software instance is significant. Therefore, cache management on the supporting hardware system is not optimized, since the cache of the host computer may manage at a given moment access to several images. The problem is intensified when the number of images is raised, for instance when a user has the opportunity to create several instances of the guest software applications.

It is therefore desirable to provide a method for virtualization of computer resources which solves or partially solve the above-mentioned problems.

SUMMARY OF THE INVENTION

Such a method is provided by claim 1. Advantageous embodiments are described in the dependent claims.

The method of the invention provides access to a data entity having a basis version, and enables the creation, for example by users or computer systems, of derived versions of the data entity. The method comprises a creating procedure for creating a derived version of the data entity, by carrying out one or more operations on the basis version, by storing the one or more operations, and by accepting the one or more operations to create the derived version. The method further comprises a providing procedure for providing access to the derived version through first addresses mapped to second addresses of the basis version and of one or more operations equal to or equivalent in result to the accepted one or more operations, by reconstructing the derived version based on the basis version and the one or more operations equal to or equivalent in result to the accepted one or more operations.

Within the meaning of the invention, a data entity is a set of data which is capable of being stored and accessed on a computer-readable medium. The data entity may for instance represent a computer file, a computer program, a software application or portions of a software application, an operating system or the files and configuration data making up an operating system or enabling to operate a computer platform.

A version is the state of a data entity, for instance the complete block-level state of a data entity. A data entity at a given state may occupy the complete memory space of a memory device or only a portion or partition of it. A data entity at a given state may also be a modified version of the data entity which occupies the complete memory space of a memory device or only a portion or partition of it. A version within the context of the invention therefore also covers a logic construction which may be transparently presented to a user or computer system as a data entity having a particular state. In this meaning of a version as a logic construction, the actual data entity in the state making up the version does not actually exist on any memory device, but can be reconstructed from the data available at one or more locations, and possibly from meta-data indicating how to reconstruct the state of the data entity corresponding to the version.

A basis version of a data entity is a version of a data entity which is actually stored on a computer-readable medium or stored in a distributed manner on a plurality of computer-readable media. One or more basis versions of a data entity, or images of the data entity, may be stored on a hardware device. The basis version may in some embodiments be viewed as a reference program.

A basis version may be empty. This may happen when a memory device is used for the first time, when nothing was written on said memory device yet. Such basis version has a size but does not contain any data, in the sense that the basis version only returns zeros, for instance. Such memory device may be similar to the "/dev/zero" special file in Unix-like operating systems.

An operation on a data entity changes the state of its content or changes how the data entity in a particular state is referred to. In other words, an operation on a data entity is defined as being a modification to the content of the data entity, thus changing the state of the content, or a modification to how the versioning information used to refer to the data entity in a particular state, or a combination of both. Therefore, an operation may consist in the creation of a new version without modifications to the data entity. An operation may also consist in one step of modifying the data of a data entity, the step leading to a derived version or the step being one step amongst a plurality of modifications leading to a derived version.

An operation may be initiated by a user, who is thus aware of the operation. An operation may instead be transparent to the user. For instance, when instantiating a new image of a data entity in a virtualized environment, or when making use of such an image, the operations corresponding to the state modification of the operating system may be automatically recorded by properly configured computer means without letting the user know about the automatic recording of the operations.

A derived version is a version of a data entity which is derived by one or more operations from a basis version. A derived version needs not be stored physically on a computer-readable medium or stored in a distributed manner on a plurality of computer-readable media. The creation of a derived version is made by carrying out one or more operations on a basis version, storing them and accepting them. A derived version can therefore be viewed as a composite version made up of a basis version and one or more operations to this basis version. A derived version may be created either by a user, to form a user-specific version, or in an automatic manner by a computer means for instance.

The method according to the invention provides the advantage of enabling the transparent access to a derived version. That is, the derived version is generally perceived by the user or computer system accessing it as being a basis version, even though the data entity in the state corresponding to the derived version does not in reality physically exist as such in memory. The appearance, functioning and behaviour of the accessed data entity is such that the non-physical presence in memory of the data entity in the state corresponding to the derived version is generally not perceived by the users or computer systems accessing the derived version.

The transparency is provided by the first addresses identifying the derived version and by the mapping of the first addresses with second addresses identifying the basis version and to the one or more operations, which are equal to or equivalent in result to the accepted one or more operations.

The first addresses identify the location or locations, for instance in one or more mapping tables, of the second addresses. The mapping or correspondence between the first addresses and the second addresses may be stored in any data storing means having a suitable structure. The mapping may be performed through third addresses or more if two or more levels of virtualization exist.

The second addresses identify the location, for instance the physical memory location, of the basis version of the data entity and the one or more operations equal to or equivalent in result to the accepted one or more operations which have led to the creation of the derived version.

In one embodiment of the method according to the invention, the providing procedure provides access to the derived version through first addresses mapped to second addresses of the basis version and of the accepted one or more operations, i.e. one or more operations equal to the accepted one or more operations. The one or more operations may therefore be stored in a simple manner to enable reconstruction of a derived version.

In one alternative embodiment of the method according to the invention, the providing procedure provides access to the derived version through first addresses mapped to second addresses of the basis version and of one or more operations which are equivalent to the accepted one or more operations. Providing access is then achieved by reconstructing the derived version based on the basis version and the one or more operations equivalent to the accepted one or more operations. Equivalent means in this context equivalent in result. The one or more operations equivalent to the accepted one or more operations are generated based the accepted one or more operations by analyzing them and re-arranging, merging and deleting operations when possible. The skilled person would understand that for instance an operation which is a modification to the portion of a data entity followed by an operation which is the deletion of the portion of a data entity is equivalent to the sole deletion of the portion of a data entity.

This embodiment may save memory space for storing the operations since the full successions of accepted operations need not be retained in memory. Instead the operations which are equivalent in result may be kept only.

The one or more operations equivalent to the accepted one or more operations may be generated at any moment by any software component. Generating the one or more operations equivalent to the accepted one or more operations may for instance be performed during the step of accepting the one or more operations.

The method according to the invention provides the further advantage of reducing memory space needed to store a derived version. Instead of storing the complete state of a derived version of a data entity, only the basis version and the operations leading to the derived version are stored.

In one embodiment, only one basis version of a given data entity is stored in a computer system, including for instance one or more data storage units. Derived versions are created from the basis version. The one or more operations equal to or equivalent in result to the accepted one or more operations corresponding to the creation of the derived versions are also stored in the computer system. These operations may be stored in a central server, in a dedicated server or in a client terminal. If the operations are stored in a central server or in a dedicated server common to the derived versions, each created from the same basis version, the ratio of the total memory space needed for the basis version and the derived versions to the number of derived versions generally decreases when the number of derived versions increases. This is because, in many applications, versions of data entities, for instance each configured for use by a user, only differ slightly from each other.

This advantage is particularly apparent in the cases where the configuration and system files associated with the data entity are used once, when a program associated with the data entity is started, and then these files are not modified any more.

The cache may also be efficiently used with the method according to the invention. Indeed, the caching of a portion of a basis version, which is accessed for reconstructing a derived version alongside the operations, is unique for all derived versions and therefore reduces data redundancy.

Furthermore, the method according to the invention provides the advantage of being well-adapted for a test or debugging environment, for instance for testing software applications or operating systems. In these environments, the method according to the invention may be used to store many derived versions of a data entity each corresponding to the result of a particular test scenario or particular test sequences of actions on a particular release of a software application or an operating system. The particular release is the basis version. The operations are caused by sequences of input actions for testing the particular release. The memory space needed for storing the release and the operations is reduced and, in addition, the state of the operating system or software may be quickly recovered and replays of the evolution of the state of a data entity may be analyzed.

Different versions of a data entity may also be quickly compared by comparing the operations which were made to create them. The comparison, in terms of the state of the stored data, of the effects of two sequences of actions in relation to a data entity may also be compared. The comparison is made easier because only the operations need to be compared, not the complete underlying data from the basis version.

In one embodiment, the reconstruction of a derived version of a data entity from a basis version and from the operations gives rise to the temporary storage of the complete block-level state corresponding to the derived version in a server or a particular section of a server so that the derived version can be tested in conditions corresponding in a faithful manner to the actual conventional way of operating the data entity. The complete state need not however be retained there once the test is completed. The server or the particular section of the server dedicated to the reconstruction of the derived version may be quickly switched from the state of a derived version to the state of different derived version.

Reconstructing means such as a reconstructing unit, module or program may be provided to construct the state of the data entity so that it can be operated in conditions corresponding in a faithful manner to the actual conventional way of operating the data entity.

The method according to the invention enables to easily and efficiently keep several parallel derived versions of a data entity, without rapidly reaching the limit of the memory capacity of the computer system. These derived versions can be easily operated, tested, scrutinized, further modified and compared. Switching from one version to another may be performed as well as replay and comparisons between them.

The method according to the invention also provides the advantage of being well-adapted to an environment wherein malicious applications may be launched, in order to properly and efficiently face these threats. Once a malicious application, or virus, is determined to be present on a computer system, the method enables to examine when the malicious application was added to the computer system, and when it started to spread or operated, by examining the operations made to the system. This gives the opportunity to search for the origin of the insertion of the malicious software application to be better able to combat it. A countermeasure may include the blocking of a particular web site or downloaded application if it is determined by analyzing the operations made to a data entity that the malicious application was added to the system when the particular web site was accessed or when an application was first launched.

A revision control system with a chronicle of the operations made to a data entity may also be provided thanks to the method according to the invention.

In one embodiment, a computer program, such as a virtualization software component, application or control program, is provided and executed to operate the intended virtualization.

In one embodiment of the method according to the invention, at least one of a plurality of derived versions is created by carrying out one or more operations on the basis version, by carrying out one or more operations on another version of the data entity, and by merging the one or more operations carried out on the basis version and the one or more operations on the other version. The other version is for instance a derived version of the same entity. The merge allows to obtain a composite derived version coming from both the basis version and another version. In the context of testing environments, this embodiment enables to combine two test sequences and to bring the data entity into a state to which no single test sequence leads.

The merge process may be performed by combining all operations made to the basis version. In the event that a conflict occurs during the merge, the skilled person will understand that different procedures may apply, such as assigning priority to one type of operations over another, assigning priority to operations made on one of the versions, prompting a user or operator to select what to do in relation to each conflict, resolving conflicts based on which user or computer component made the operations, the date and so on.

In one embodiment of the method according to the invention, the step of accepting the one or more operations to create the derived version has an atomic nature, i.e. either the one or more operations are all accepted, or the one or more operations are not accepted and the derived version is kept in the state preceding the one or more operations.

In this embodiment, accepting the one or more operations includes one or more steps forming an atomic process. An atomic process has only two possible outcomes: a success or a failure. If accepting one or more of the operations to produce the new derived version fails, then state of the data entity is restored to the state preceding all the operations. In that case, no derived version is created based on a partially successful accepting step. In the event of a successful accepting process, the intermediate operations leading to the derived version may be kept or not. Not keeping the intermediate operations saves memory space, while keeping them enables to trace the changes which led to the derived version.

The atomic nature, or atomicity, of the step of accepting one or more operations to create a derived version has a raison d'être and provides advantages even in the event that each one of the operations (e.g. modifications) may individually have been created through an atomic process. In other words, the atomicity at the operation level, i.e. the atomicity of each individual operation, does not deprive the atomicity at the version level, i.e. the atomicity of the versioning, of its advantages. The reason is that the creation of a version creates more data than the data constituting the operations. The creation of a version creates meta data for forming the version, labelling it as a version, indicating where the data needed for reconstructing the version is stored and, if the step of accepting the one or more operations involves processing them (e.g. for removing operations that have no impact on the final result of a series of operations), indicating the result of the processing.

The atomicity at the version level provides a guarantee of consistency in the versioning process and, while based the atomicity at the modification level, it goes further and provides increased reliability.

In one embodiment of the method according to the invention, the step of carrying out each one of the one or more operations on the basis version has an atomic nature, i.e. either an operation is accepted, or the operation not accepted, the state prior to said operation is kept and the operations is discarded.

In one embodiment of the method according to the invention, the method further comprises a further creating procedure for creating a further derived version of the data entity by carrying out one or more operations on a derived version, storing the one or more operations, and accepting the one or more operations to create the further derived version. In this embodiment, the providing procedure is further for providing access to the further derived version. This embodiment enables the creation of further derived versions which are composite versions made up of a derived version and operations to this derived version.

In one embodiment of the method according the invention, full recursion is enabled. A further derived version may be created from a derived version or from another further derived version. The reconstruction is then also a recursive process. In that sense, one embodiment of the method according to the invention is a method for controlling a tree or hierarchical structure representing operations made to a basis version of a data entity.

These embodiments have the advantages of enabling a tree structure or hierarchical structure of derived and further derived versions to be created from a basis version. The access to a derived version or further derived version is transparent in that users perceive the derived version and further derived version as a conventional data entity in spite of the fact that there is no need for retaining in memory the whole state of each version. The tree or hierarchical structure itself needs not to physically exist in memory beyond the existence of the recorded operations enabling to reconstruct the derived and further derived versions and the logic operations linking them.

Enabling a tree structure or hierarchical structure of derived and further derived versions to be created further reduces memory space needed to store a derived version. Indeed, if two planned derived versions share the same initial operations carried out on a version, which may be a basis version, a derived version or a further derived version, the two planned derived versions can be both created from a common intermediate derived version. This reduces the memory space needed to store the versions.

This embodiment is well-adapted for a test or debugging environment in that test scenarios and the resulting versions may be organized in a tree or hierarchical structure, thus multiplying the sequences of tested actions and tested resulted states available without multiplying the memory space needed.

Derived versions, i.e. versions derived from a basis version without any intermediate version, and further derived versions, i.e. versions derived from a basis version through at least an intermediate derived version, may have the same software structure and may be handled in the same manner from a computer implementation perspective and from a user interaction perspective. The distinction is made herewith for explaining in a clear manner the different embodiments of the method according the invention.

One embodiment offers full recursion. In this embodiment, both derived versions and further derived versions have no limit as to the number of levels of derivation. Another embodiment offers limited recursion. In this embodiment, both derived versions and further derived versions have a limit as to the number of levels of derivation. Yet another embodiment offers no recursion. In this embodiment, only derived versions deriving from a basis version are offered.

In the embodiments offering full or partial recursion, an expression "derived version" having a more general meaning may have been used to cover both the "derived versions" (having a narrow meaning, as defined above) and the "further derived versions" (as defined above). In that case, the "derived versions" (having a narrow meaning) may therefore have been designated for instance as "first derived version" or "first-level derived version". The skilled person will therefore understand the invention in view of these considerations.

In one embodiment of the method according to the invention, a derived version or a further derived version includes data relating to the state of the data entity; and meta-data relating to the mapping of the first addresses with the second addresses for providing access to and reconstructing the derived version. In this embodiment, a version may be viewed as a logic construction made up of actual data and meta-data consisting in a function enabling the reconstruction of the version. The meta-data for instance indicates which blocks make up a version and for each block of the version the state of the block compared to the basis version. The meta-data may for instance be translated to mean "no change to the memory blocks except block 25 modified by 2 successive changes, the 2 successive change being . . . , memory block 65 modified by 1 change, the change being . . . , etc". The operations may be block-level differential information to reconstruct the derived state of a data entity.

In one embodiment of the method according to the invention, the data entity is stored on block devices and the method is adapted for managing data entities and versions of data entities stored on block devices. A block device is a memory storage unit on which data is moved, i.e. written and read, in the form of blocks. Examples of block devices may be addressable devices such as hard disks and CD-ROM drives.

When the data entity is stored on block devices, a version may be viewed as the state of the data entity at a memory block level. The basis version is the version initially stored in the block device, or in the block devices if the basis version is distributed across several block devices. A derived version of a data entity can be reconstructed based on the basis version and the operations, which may be modifications made to the data entity, where each modification corresponds to a modification at the block level. After an arbitrary number of block-level modifications, the modifications are accepted and the derived version is accepted, for instance via a commit action if the accepting step is an atomic process. The atomic character of a block read, write, update, delete or add action may be hardware-based and guaranteed by the block device manufacturer.

Instead of actually carrying out the input/output (I/O) memory block-level operations (e.g. modifications) of the original basis version, the block-level operations are stored so that the basis version is unaffected. In order to store the block-level operations, a procedure may be provided to intercept the modifications made to the data entity. Such procedure may be operated by a dedicated software component and may consist in detecting on a temporary image of the data entity which blocks are modified as a function of time during the interaction with the user or client computer system. The procedure which is provided to intercept the modifications made to the data entity may be a software-based virtualization procedure making use of a sandbox-like controlled zone.

The invention also relates to an apparatus. Advantageous embodiments are described in the dependent claims.

The apparatus of the invention is configured for providing access to a data entity having a basis version, and for enabling the creation of derived versions of the data entity. The apparatus comprises a creating unit configured for creating a derived version of the data entity by carrying out one or more operations on the basis version, by storing the one or more operations, and by accepting the one or more operations to create the derived version. The apparatus further comprises a providing unit configured for providing access to the derived version through first addresses mapped to second addresses of the basis version and of one or more operations equal to or equivalent in result to the accepted one or more operations, by reconstructing the derived version based on the basis version and the accepted one or more operations equal to or equivalent in result to the accepted one or more operations.

The method and apparatus according to one embodiment of the invention are such that, from version to version, i.e. from a basis version to a derived version, or from a derived version to a further derived version, the memory space of the version can change. In this embodiment, a user or a computer system may have the perception that a certain amount of memory space is available or reserved to said user or computer system while this is actually not the case.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims. In particular, the embodiments described independently throughout the description can be combined to form further embodiments to the extent that they are not mutually exclusive.

Figure 1:
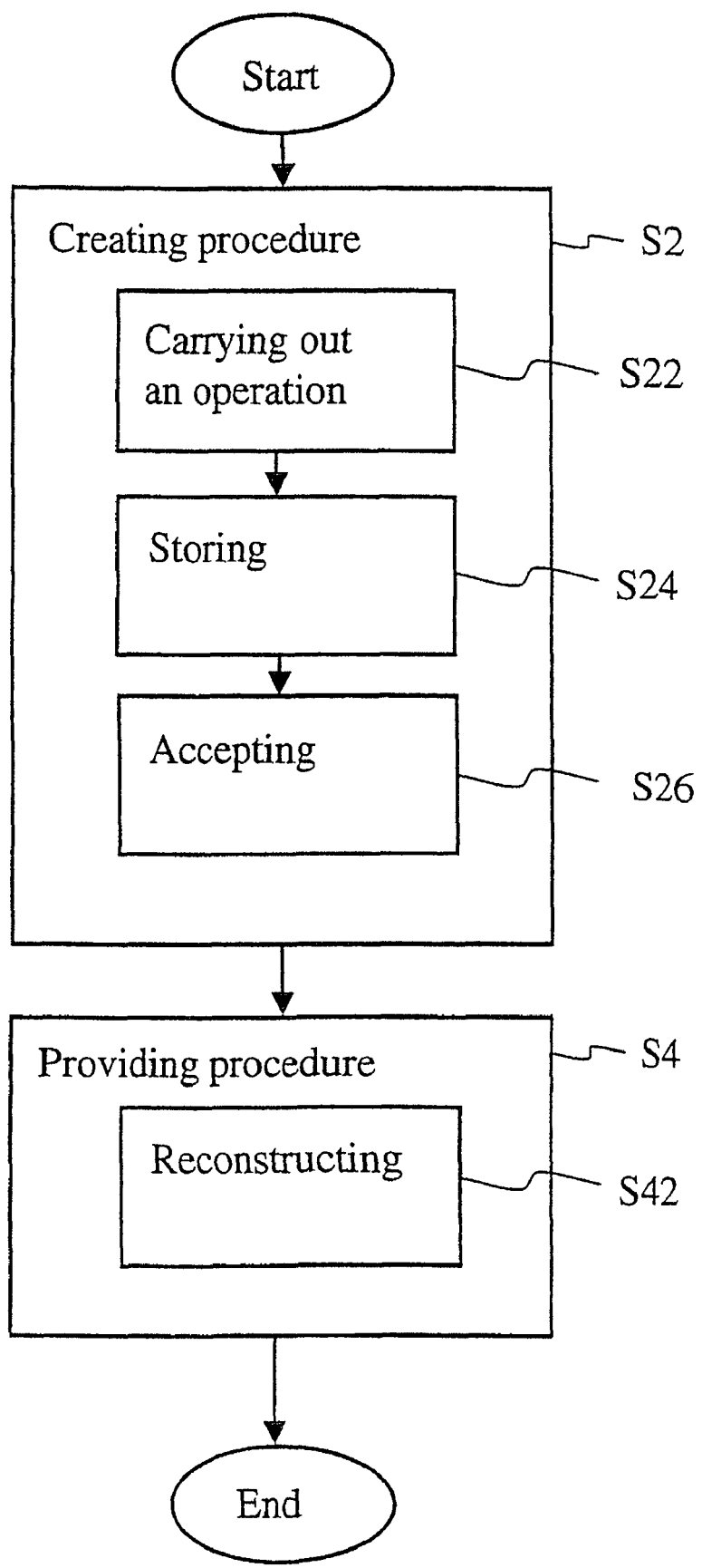
FIG. 1 shows a flow chart of an embodiment of the method according to the invention.

FIG. 1 shows a flow chart of an embodiment of the method according to the invention. A creating procedure S2 is provided for letting a user or a computer system create a derived version 16 of a data entity. A user may voluntarily create a derived version 16, and a user interface may be provided to this end. The creating procedure S2 may also be operated by computer means as soon as a user modifies the basis version 12 of the data entity. The creating procedure S2 may therefore be operated by computer means, such as a software component, in an automatic manner. The creating procedure S2 is in any case a computer-implemented creating procedure.

The creating procedure S2 is performed by carrying out S22 one or more operations 14 on the basis version 12 of the data entity. An operation 14 may occur at any moment during the interaction of a user with the software application which makes use of the data entity. The data entity may be a set of configurations files, registry entries or library or documentation files. An operation 14 may also occur during the execution of a software program when the need arises to modify, update, delete or add information to the data supporting the software application, the data being in this case the data entity.

When one or more operations 14 are carried out S22, these operations 14 are stored S24 for later retrieval. The storing S24 of the one or more operations 14 may be done after each operation 14 is performed or when this operation 14 is performed by a software component listening to the input/out exchanges made with one or more accessed storage devices.

The creating procedure S2 also comprises accepting S26 the one or more operations 14 to create the derived version 16. The accepting S26 of the operations 14 may form an atomic process. Once the accepting S26 process has been performed, the content of the operations 14, for instance modifications, may be analysed in order to reduce their numbers, by merging them or removing the operations 14 which do not have any impact on the global result of accepting the series of operations 14. A plurality of operations 14, including at least two modifications, may in some cases globally lead to a derived version 16 which content is identical to the content of the basis version 12, or to a further derived version 20 which content is identical to the content of the derived version 16. This occurs if the at least two modifications cancel each other out. In that cases, the plurality of operations 14, including at least two modifications, are equivalent to an operation of creating a new version, without making any modification to the data itself.

The embodiment of the invention as illustrated in FIG. 1 also comprises a providing procedure S4 for providing access to the derived version 16 through first addresses mapped to second addresses of the basis version 12 and of operations 14 enabling the reconstruction S42 of the derived version 16 based on the basis version 12.

As a non-limiting example, the data entity may be constituted by all the data making up an operating system. In that particular case, a server 10 may be provided with a basis version 12 of the operating system. During the virtualization process, when the operating system is started, for one user, the corresponding programs are executed on the processor and RAM of the server and all the operations being modifications 14 made to the data stored on the server memory 10 are intercepted and recorded. Similarly, when the operating system executing on the processor and RAM requests data from a particular block of the memory, a software component intercepts the I/O requests, and, if the software component which has the function of intercepting the I/O request finds that the particular requested block has been modified, the software component returns the modified information based on the recorded modifications 14.

This allows a significant reduction of the memory needed to execute a plurality of operating systems on one server.

Figure 2A:
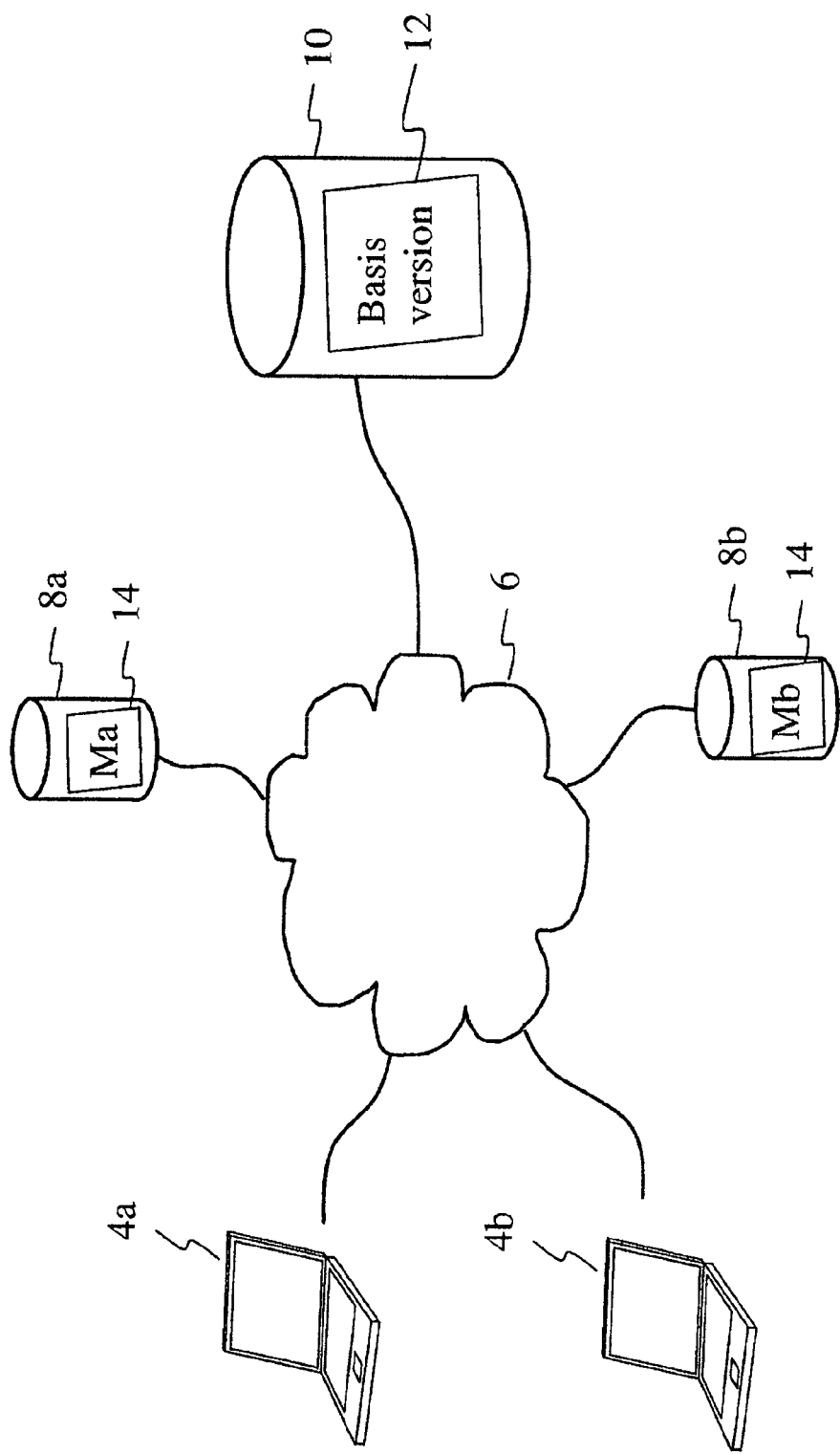
FIGS. 2a, 2b and 3 shows schematic network configurations of embodiments of the method according to the invention.

FIG. 2a illustrates a schematic network configuration of an embodiment of the method according to the invention. A basis version 12 is stored on a data storage unit 10. In the exemplary embodiment, two users access two client terminals 4a, 4b and each of them accesses and modifies the data entity to create a user-specific derived version 16 based on the basis version 12. Any number of clients may be provided.

The interactions between the client terminals 4a, 4b and the data entity of which the basis version 12 is stored in the storage unit 10 are transparent. This means that each client terminal 4a, 4b perceives that it is accessing a data entity in a state stored in the storage unit 10, while in reality a basis version 12 is shared between the client terminals 4a, 4b and user-specific derived versions Ma, Mb 14 are used to reconstruct the derived versions 16. The operations Ma 14 and Mb 14 are respectively stored in storage units 8a, 8b. The interactions between the client terminals 4a, 4b and the data entity, i.e. the interactions with the basis version 12 and the operations Ma, Mb, 14, are performed through a network 6.

The network 6 may be any kind of network, for instance a storage area network (SAN) or a local area network (LAN), based on any protocol such that FibraChannel-protocol, iSCSI, RDMA, or FibreChannel Hardware.

In an alternative embodiment, the data storage units 8a and/or 8b may be the same as the data storage unit 10. In yet another alternative embodiment, the data storage units 8a and/or 8b may be integrated respectively within the client terminals 4a and/or 4b.

Figure 2B:
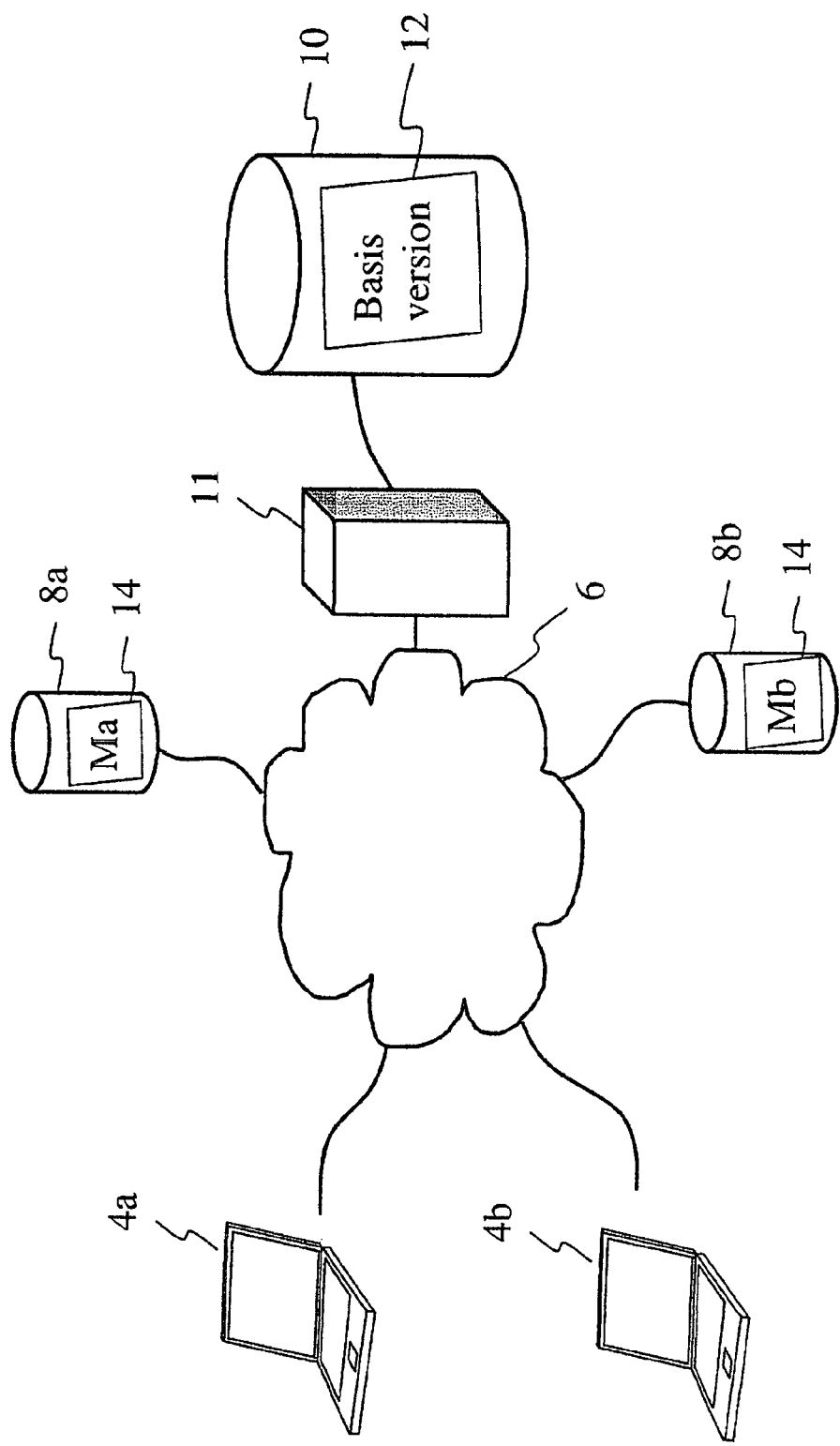

FIG. 2b illustrates a schematic network configuration of another embodiment of the method according to the invention.

In this embodiment, a server computer 11 is included and holds a software program, unit or component in charge of performing the method according to the invention. The software program, unit or component is in charge of identifying the operations 14 carried out S22 on the basis version 12, for instance by intercepting them. The software program, unit or component is further in charge of storing said operations 14. The software program, unit or component is also in charge, when the operations are accepted to create a derived version 16, of updating the mapping information, and optionally processing and merging the operations 14. Finally, the software program, unit or component is in charge of providing access to derived versions by reconstruction.

The software program, unit or component operating on the server 11 may be viewed as the virtualization core component for implementing the transparency capabilities of the system, i.e. processing the input and output exchanges between the server 11 and the data storage units 10, 8a and 8b in order to make them transparent with respect to the client terminals 4a, 4b. To this end, the software program, unit or component may have a temporary execution space for executing the program corresponding to a derived version 16 while the corresponding data stored in memory exist through the basis version 12, the operations 14 and the mapping information (meta-data) for reconciling the basis version 12 and the operations 14.

In the embodiment illustrated in FIGS. 2a and 2b, the method is carried out in the context of a client-server scenario over a network 6. Alternatively, the method may be carried within a single computer.

Figure 3:
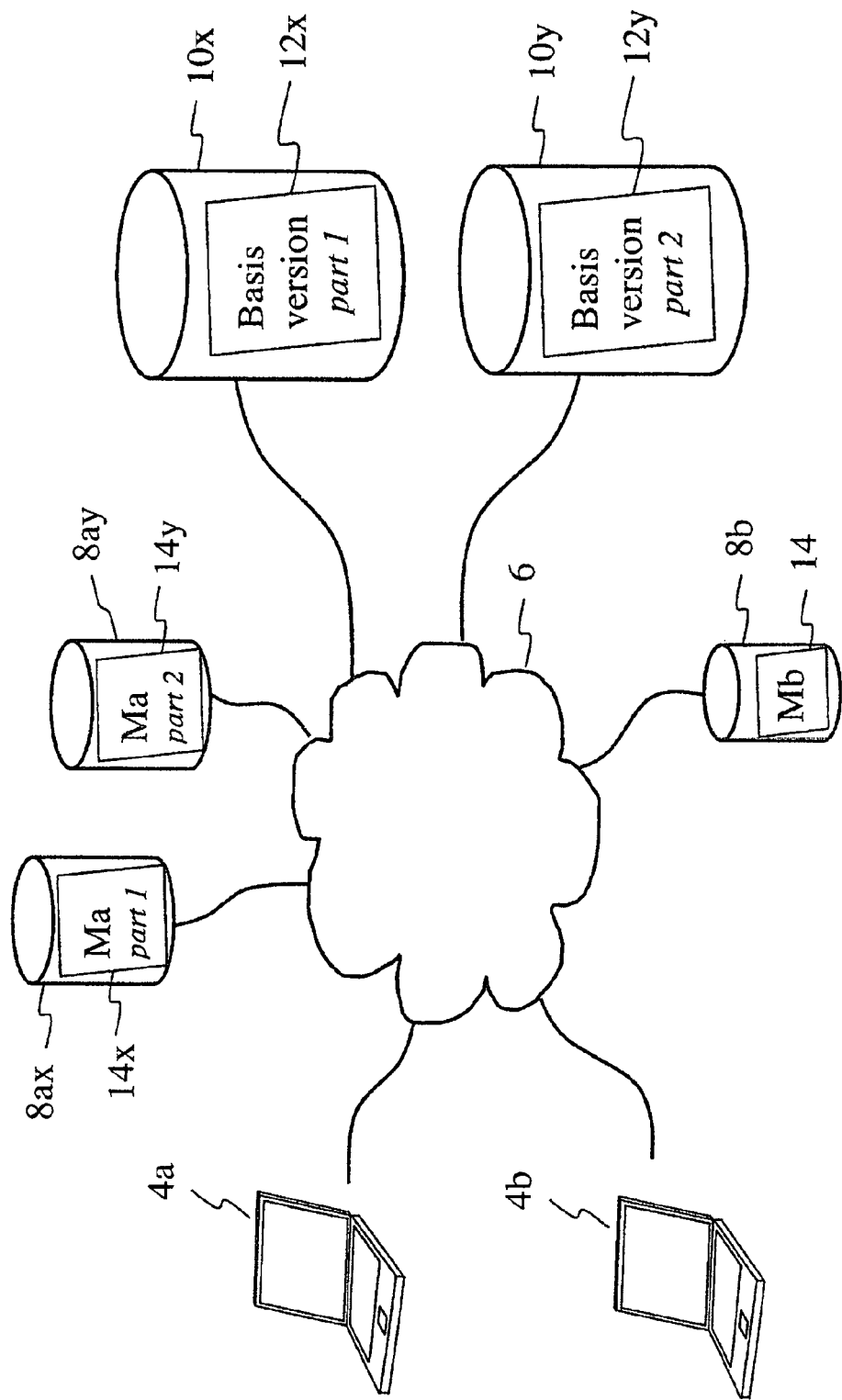

FIG. 3 illustrates a schematic network configuration of another embodiment of the method according to the invention. In this embodiment, the basis version 12x, 12y includes two parts, part 1 and part 2, respectively stored on two storage units 10x, 10y. A first client terminal 4a interacting with the data entity makes use of the two parts 12x, 12y of the basis version 12 and the respective operations Ma 14x, 14y made to the basis versions 12x, 12y are respectively stored in two storage units 8ax, 8ay.

In contrast, the client terminal 4b has all its operations Mb 14 stored in one storage unit 8b.

The network configuration of FIG. 3 illustrates that the basis version 12 and the operations 14 need not be stored in one single storage unit. There may be a plurality of storage units 10 used for storing the data corresponding to the basis version 12 and a plurality of storage units 8 for storing the operations 14.

In one embodiment, the software program, unit or component operating on the server 11 illustrated on FIG. 2b is used to transparently manage the access to and control of the information stored in the data storage units 10x, 10y, 8ax, 8ay and/or 8b. In other words, the software program, unit or component may be viewed as being a virtualization component to manage the transparent access to and control of the distributed data and versions of the data entity.

Figure 4:
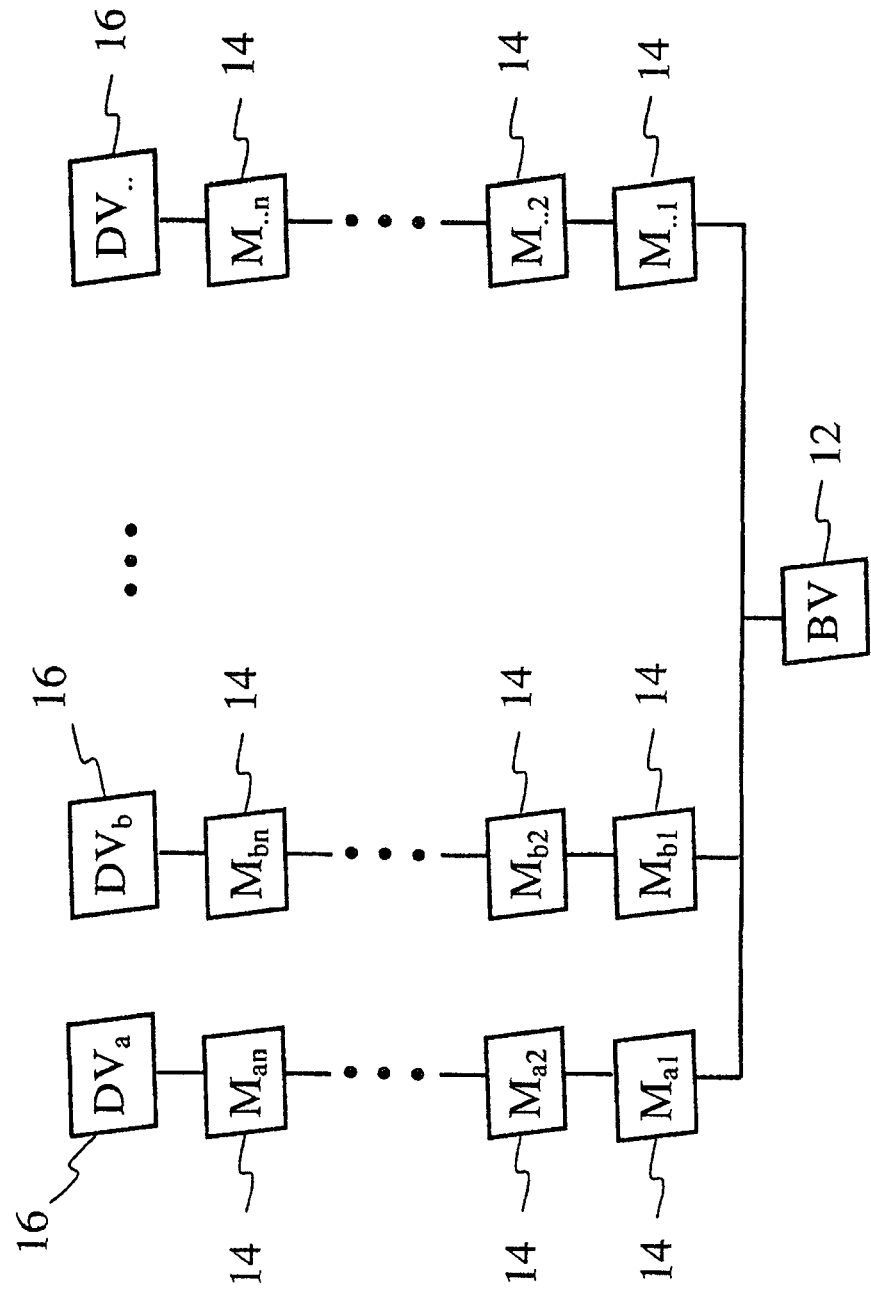
FIGS. 4, 5, 6a, 6b, and 7 show schematic representations of the logic relationship between versions of a data entity in various embodiments of the invention.

FIG. 4 shows a schematic representation of the logic relationship between the versions of a data entity in one embodiment of the invention. A basis version BV 12 is represented. From this basis version BV 12, three sequences of operations 14, the sequence $M_{a1}, M_{a2}, \ldots, M_{an}$, the sequence $M_{b1}, M_{b2}, \ldots, M_{bn}$, and the sequence $M \ldots _1, M \ldots _2, \ldots, M \ldots _n$ are performed to create respectively three derived versions 16: $DV_a, DV_b, \ldots, DV \ldots$. The three sequences of operations 14 each start from a unique basis version 12.

Figure 5:
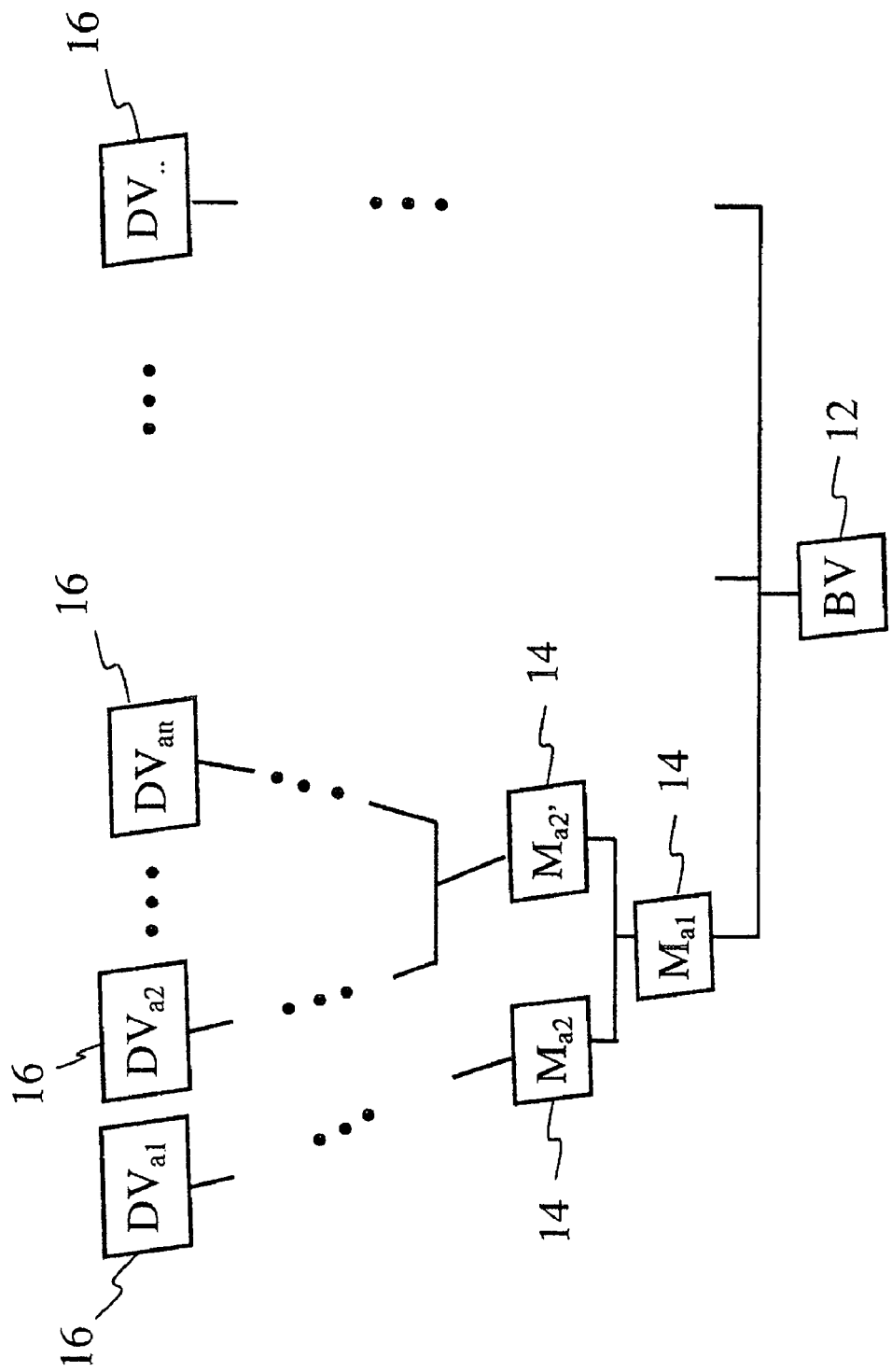

FIG. 5 shows a schematic representation of the logic relationship between versions of a data entity in another embodiment of the invention. This embodiment differs from the embodiments of FIG. 4 in that one operation 14 gives rise to a plurality of sequences, or branches, of operations 14. Therefore, from a basis version BV 12, a plurality of derived versions $DV_{a1}, DV_{a2}, \ldots, DV_{an}$ 16 are created from a series of operations 14, wherein one operation $M_{a1}$ 14 is the common first modification 14 leading to each of the plurality of derived versions $DV_{a1}, DV_{a2}, \ldots, DV_{an}$ 16.

Figure 6B:
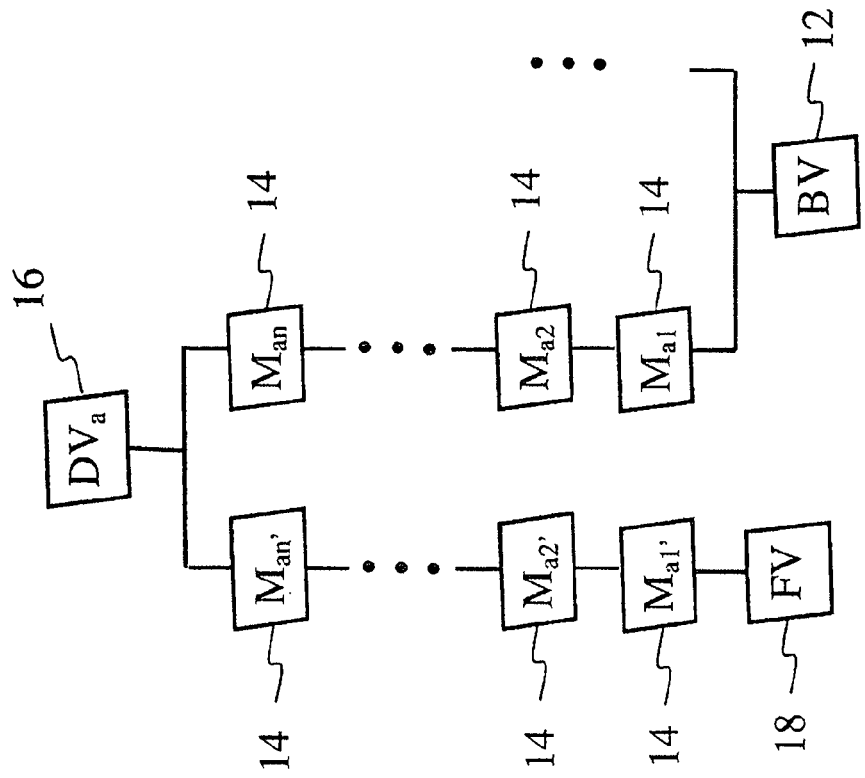
Figure 6A:
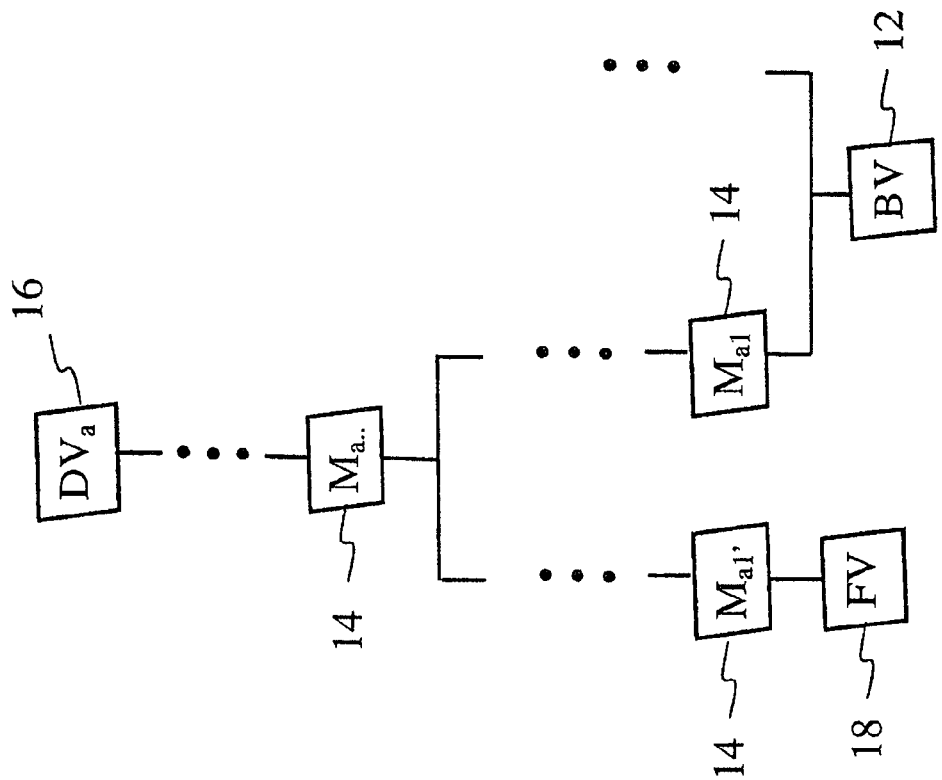

FIG. 6a illustrates a schematic representation of a logic construction of operations 14 leading from a basis version BV 12 and another version, referred to as a foreign version FV 18, to a derived version $DV_a$ 16. A merge is performed between the operations $M_{a1'}, M_{a2'}, \ldots, M_{an'}$ 14 and the operations $M_{a1}, M_{a2}, \ldots, M_{an}$ 14.

As shown in FIG. 6b, which illustrates another schematic representation of the relationships between versions of a data entity in another embodiment of the method of the invention, after a merge, further operations $M_a \ldots$ 16 may be made before accepting them to create the derived version $DV_a$ 16.

Figure 7:
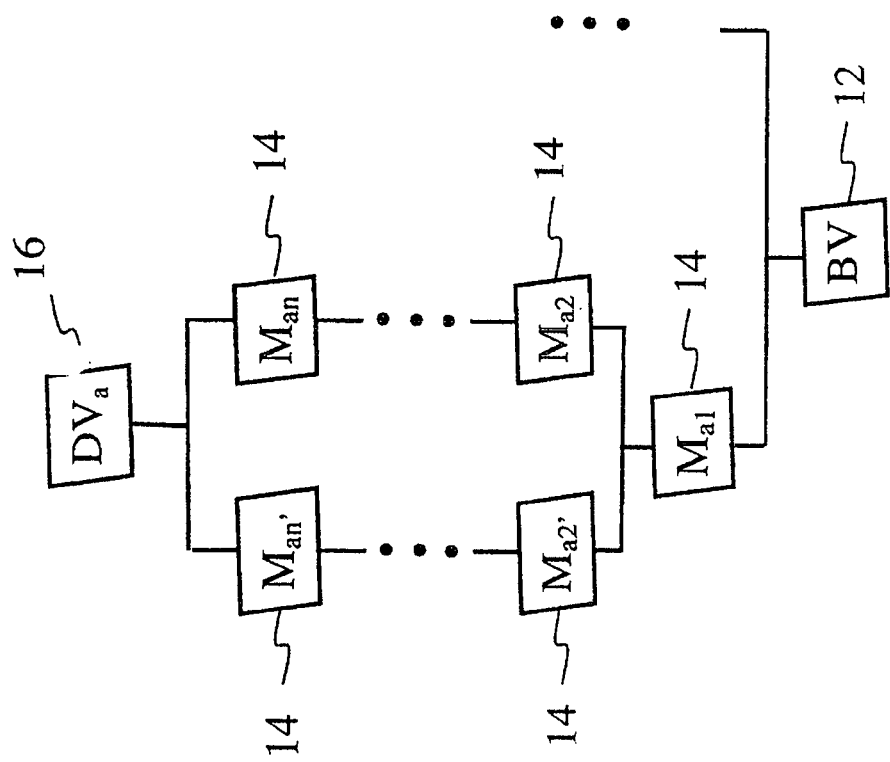

FIG. 7 illustrates another schematic representation of the logic relationships between versions 12, 14, 16 of a data entity in another embodiment of the invention. In that case, one derived version $DV_a$ 16 is created based on operations 14 made to a basis version BV 12. The initial sequence of operations 14, after the first operation $M_{a1}$ 14 is performed, is split into two branches or sub-sequences of operations 14: the branch of operations $M_{a2}, \ldots, M_{an}$ 14 and the branch of operations $M_{a2'}, \ldots, M_{an'}$ 14. A merge occurs between these two branches of operations 14, for creating the derived version $DV_a$ 16.

Figure 8:
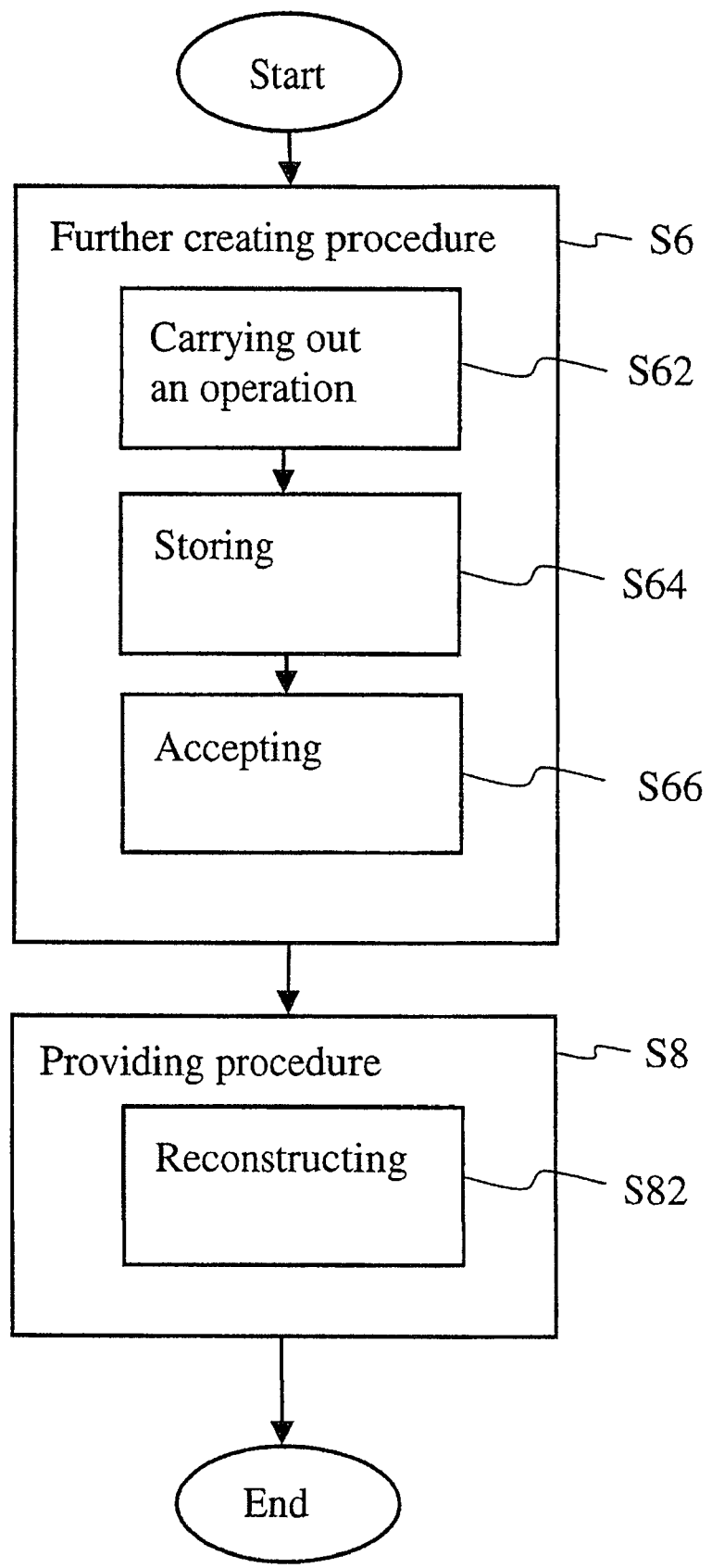
FIG. 8 shows a flow chart of another embodiment of the method according to the invention.

FIG. 8 shows a flow chart of another embodiment of the method according to the invention, wherein a further creating procedure S6 is provided for creating a further derived version 20 based on a derived version 16. This embodiment may be adapted to create a further derived version 20 from another further derived version 20. This provides a recursion-based creation of derived versions 16, 20. In general, a version 12, 16, 20 may possess no antecedent version (the version is then said to be a basis version), one antecedent version, or more than one antecedent versions.

If a version 12, 16, 20 possesses more than one antecedent versions, these antecedent versions may include a succession of versions (with one version leading to one version), the merge of versions (wherein a plurality of versions lead at one point to one version) or the split of versions (wherein one version leads at one point to a plurality of versions), and both a merge and a split of versions (wherein a plurality of versions lead at one point to a plurality of versions). Each derived version 16 or further derived version 20 may serve as a basis for another further derived version 20, which may be viewed as a child version.

The further creating procedure S6 for creating a further derived version 20 of the data entity is performed by carrying out S62 one or more further operations 14 on a derived version 16. Then, the one or more further operations 14 are stored S64. Finally, the procedure S6 includes accepting S66 the one or more further operations 14 to create the further derived version 20.

The providing procedure S8 for providing access to the further derived version 20 is similar to the providing procedure S4 as described in FIG. 1. The reconstructing step S82 is likewise similar to the reconstructing step S42 as described in relation to FIG. 1. However, the reconstructing step S82 from a basis version 12 additionally includes making use of the antecedent versions 16, 20, i.e. the versions 16, 20 which are intermediate between the basis version 12 and the further derived version 20, to reconstruct the further basis version 20.

In that sense, the method according to the invention may provide a revision control system for managing a plurality of versions 12, 16, 20 of a data entity. Such a revision control system is useful and applicable in the technical fields of engineering development, software development, technical management of the versioning of business and legal documents, etc.

Figure 9:
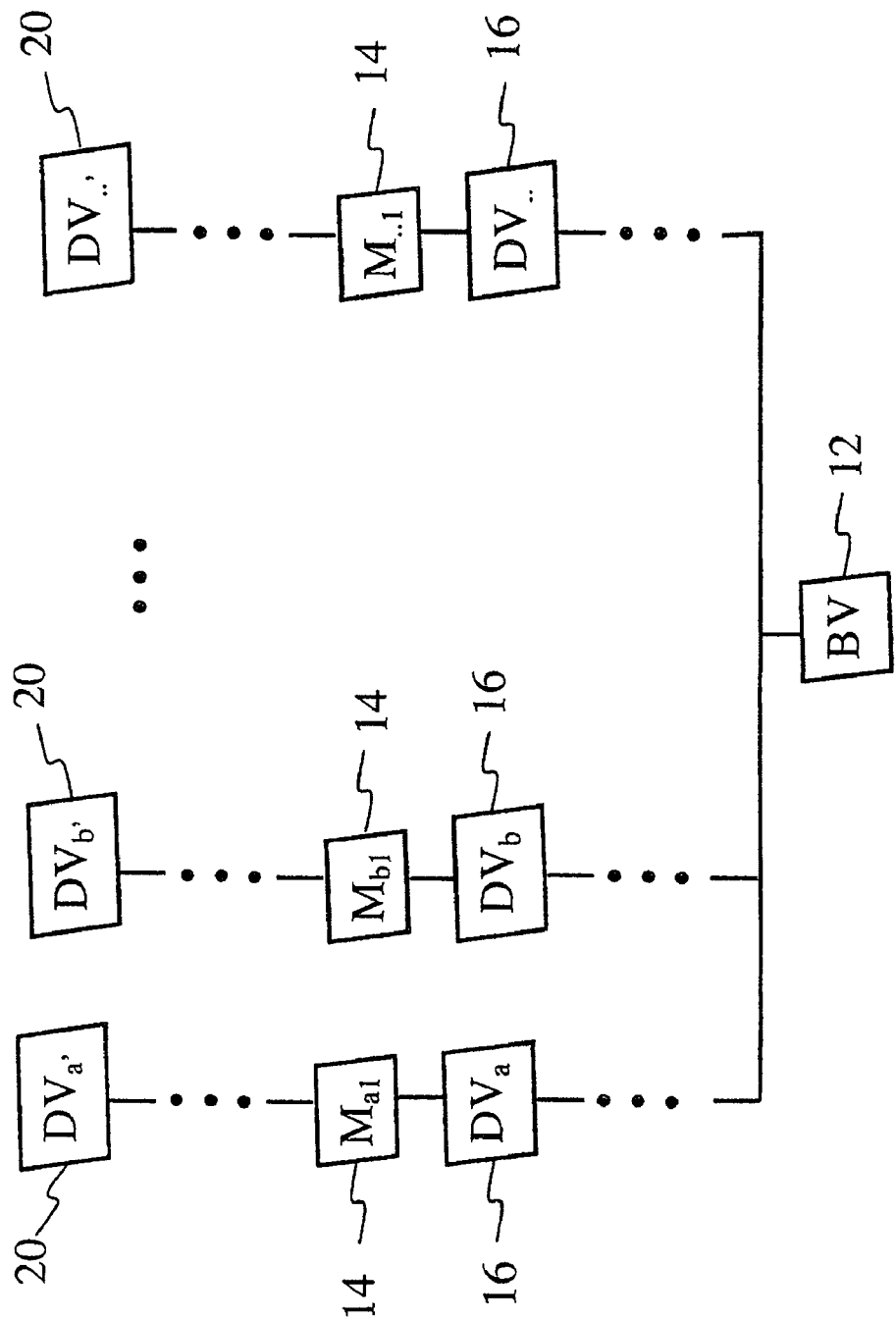
FIGS. 9, 10, 11a, and 11b, show schematic representations of the logic relationship between versions of a data entity in other embodiments of the invention.

FIG. 9 shows a schematic representation of the logic relationship between versions of a data entity in another embodiment of the invention, wherein a series of operations 14 are performed to first create a derived version $DV_a, DV_b, \ldots,$ DV $\ldots$ 16 from a basis version BV 12, and then other operations $M_{a1}, M_{b1}, \ldots, M \ldots_1$ 14 are performed to create further derived versions $DV_{a'}, DV_{b'}, \ldots, DV \ldots'$ 20 from the derived versions $DV_a, DV_b, \ldots, DV \ldots$ 16.

Figure 10:
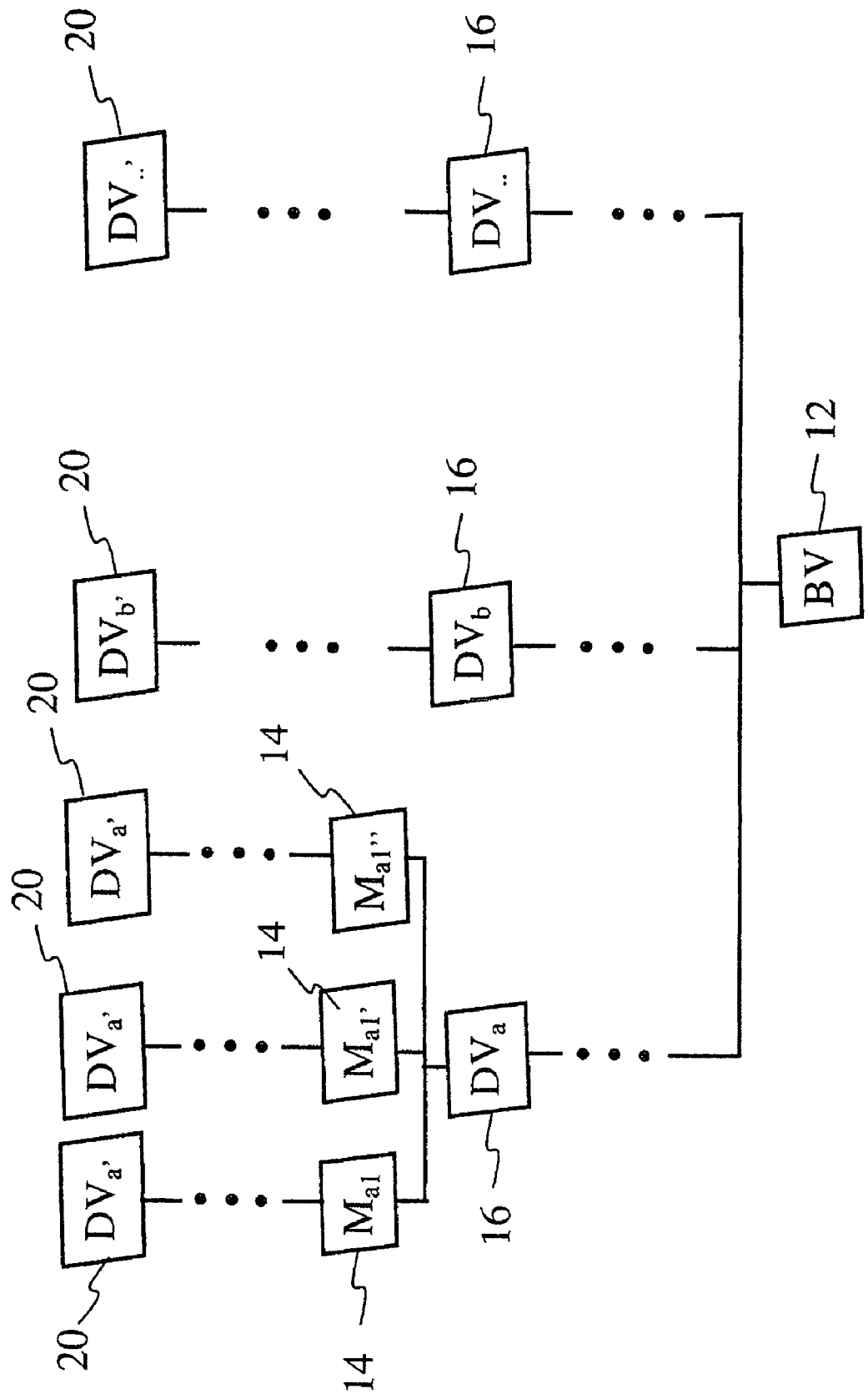

FIG. 10 illustrates yet another embodiment, wherein a series of further derived versions $DV_{a'}$ 20 are created from one derived version $DV_a$ 16 by performing a series of branches of operations $M_{a1}, \ldots, M_{a1'}, \ldots$ and $M_{a1''}$ 14, each eventually leading to one further derived version 20.

Figure 11:
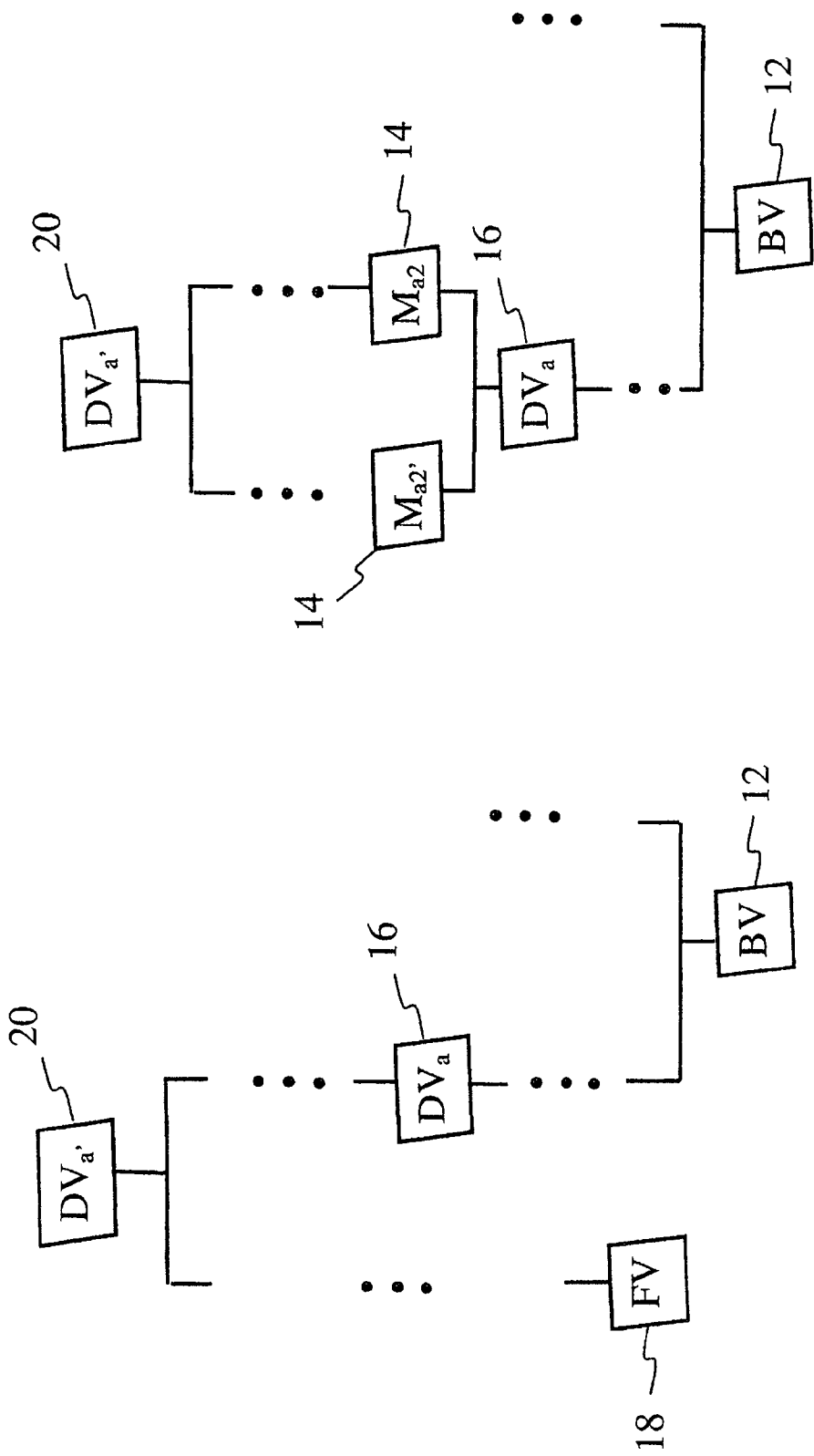

FIG. 11a shows another schematic representation of the logic relationship between versions of a data entity in another embodiment of the invention, wherein a further derived version $DV_{a'}$ 20 is created from operations 14 performed on a basis version BV 12 and leading to a derived version $DV_a$ 16, from operations 14 performed on said derived version $DV_a$ 16, and from operations 14 performed on another version, i.e. a foreign version FV 18. The operations 14 are merged as illustrated to create the further derived version $DV_{a'}$ 20.

FIG. 11b illustrates a slightly different arrangement of versions 12, 16, 20 and operations 14. The derived version $DV_a$ 16 is created from operations 14 made to the basis version BV 12. Then, from this derived version $DV_a$ 16, two branches of operations $M_{a2}, M_{a2'}$ 14 are performed, stored, merged and accepted to create the further derived version $DV_{a'}$ 20.

Figure 12:
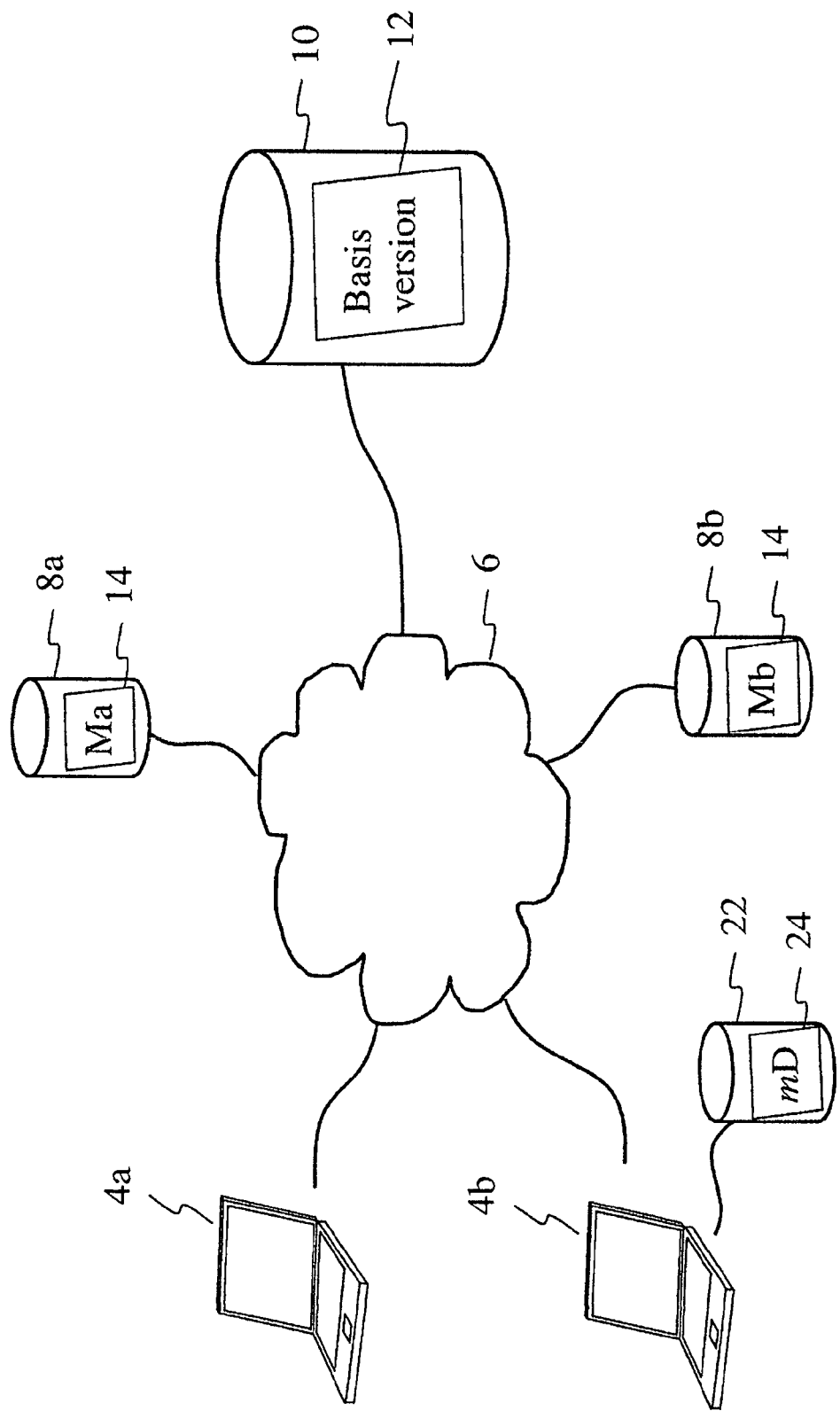
FIG. 12 shows a schematic network configuration of another embodiment of the method according to the invention.

FIG. 12 shows a schematic network configuration of another embodiment of the method according to the invention. In this embodiment, meta-data mD 24 is stored in a storage unit 22 in order to enable a client terminal 4b to reconstruct a derived version 16. The derived version 16 is a logic construction which includes data relating to the state of the data entity, i.e. the basis version 12 and the operations Mb 14, and meta-data mD 24 relating to the mapping of the first addresses with the second addresses for providing access S4, S8 and reconstructing S42, S82 the derived version 16 or the further derived version 20.

The meta-data mD 24 is illustrated in FIG. 12 as being directly linked to the client terminal 4b. This is only one option. Other options include other manners of providing access to the meta-data mD 24 through a software component (for instance stored in a server 11 as illustrated in FIG. 2b) in charge of reconstructing a derived version 16, 20 based on a mapping using the meta-data mD 24. The mapping information, i.e. the meta-data mD 24 may for instance be stored in the same data storage unit 8a, 8b as the operations 14 or in the same data storage unit 12 as the basis version 12.

Each derived version 16, 20 may be viewed as recursively constructed on the basis of meta-data 24 and data of the version it self and all its antecedent versions.

Figure 13B:
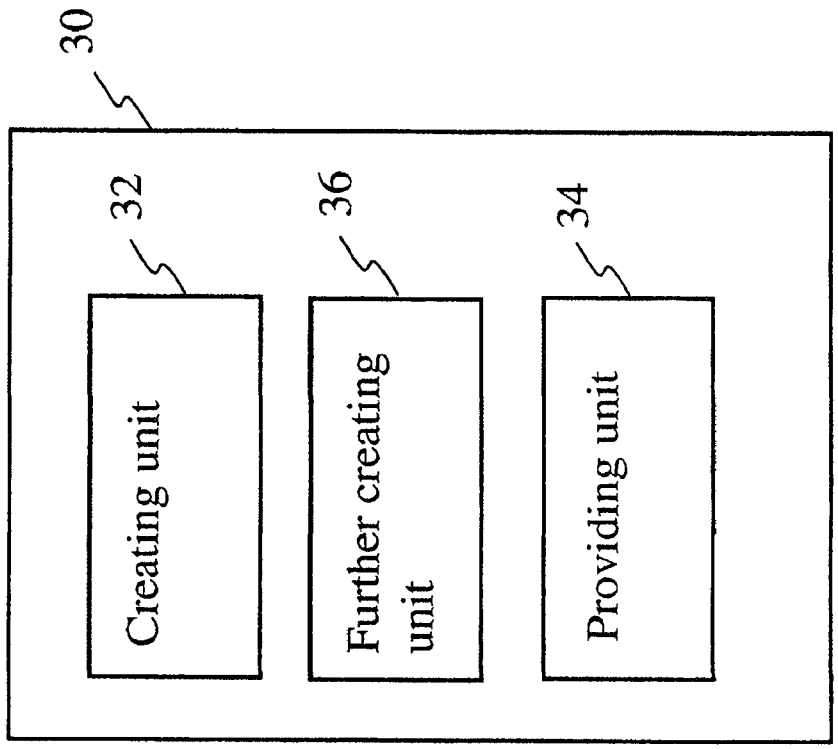
FIGS. 13a and 13b show schematic representation of embodiments of an apparatus according to the invention.
Figure 13A:
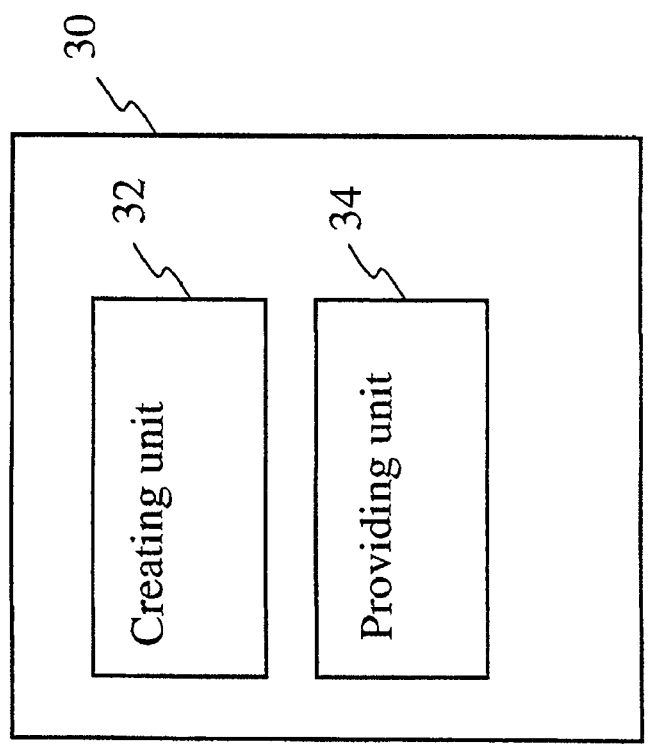

FIGS. 13a and 13b show schematic representations of embodiments of apparatuses according to the invention. The apparatus 30 configured for providing access to a data entity having a basis version BV 12, and for enabling the creation of derived versions 16 of the data entity, includes a creating unit 32 configured for creating a derived version 16 of the data entity by carrying out one or more operations 14 on the basis version 12, storing the one or more operations 14, and accepting the one or more operations 14 to create the derived version 16. The apparatus 30 also comprises a providing unit 34 configured for providing access to the derived version 16 through first addresses mapped to second addresses of the basis version 12 and of one or more operations equal to or equivalent in result to the accepted one or more operations 14. The step of providing access to the derived version 16 is performed by reconstructing the derived version 16 based on the basis version 12 and the one or more operations equal to or equivalent in result to the accepted one or more operations 14.

In the apparatus schematically represented in FIG. 13b, a further creating unit 36 is further provided in order to create a further derived version 20 from a derived version 16 or, more generally, a further derived version 20 from another further derived version 20.

Where the term "unit" is used herewith (for instance in "creating unit", "providing unit" or "further creating unit"), no restriction is made regarding how distributed the constituent elements of a unit may be and regarding how gathered units may be. That is, the constituent elements of a unit may be distributed in different software or hardware components or devices for bringing about the intended function. A plurality of distinct units may also be gathered for providing the intended functionalities.

Figure 14:
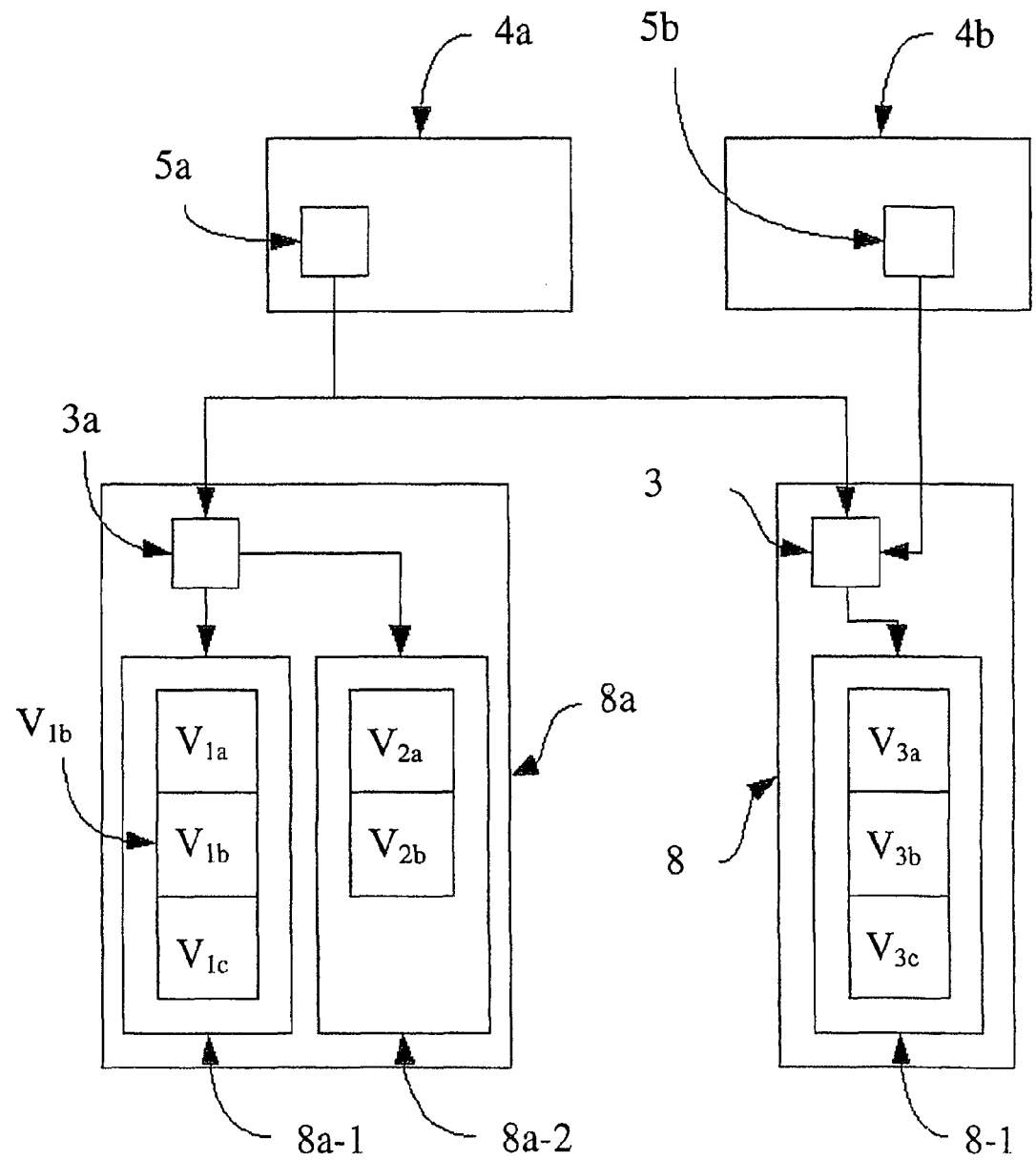
FIG. 14 schematically illustrates an embodiment of the method and apparatus according to the invention.

FIG. 14 illustrates an embodiment of the method and apparatus according to the invention.

In a storage unit 8a, two series of versions $V_{1a}, V_{1b}, V_{1c}$ and $V_{2a}, V_{2b}$ are stored and controlled. Each series of versions constitutes a log file and includes operations 14 (not illustrated) and meta-data 24 (not illustrated). In one part 8a-1 of the storage unit 8a, a series of three versions $V_{1a}, V_{1b}, V_{1C}$ is stored. In another part 8a-2 of the storage unit 8a, a series of two versions $V_{2a}, V_{2b}$ is stored. These versions $V_{1a}, V_{1b}, V_{1c}, V_{2a}, V_{2b}$ are controlled by a controlling unit 3a.

In another storage unit 8, one series of versions $V_{3a}, V_{3b}, V_{3C}$ is stored and controlled. This series of versions also constitutes a log file and also includes operations 14 (not illustrated) and meta-data 24 (not illustrated). The series of versions $V_{3a}, V_{3b}, V_{3C}$ is more specifically stored in a part 8-1 of the storage unit 8. These versions $V_{3a}, V_{3b}, V_{3c}$ are controlled by a controlling unit 3.

The control units 3a, 3 control the access to the versions, i.e. the access to the content of the versions, and administer them. Administering versions includes controlling the creation of versions.

Client terminals 4a, 4b each respectively comprise an interacting component 5a, 5b for accessing the versions controlled by the control units 3a, 3 and for interacting with these control units 3a, 3. Client terminals 4a, 4b access to the versions through the interacting components 5a, 5b. The interaction between client terminals 4a, 4b and control units 3a, 3 may be achieved through a computer network 6 (not illustrated in FIG. 14, but shown on other FIGS. 2, 2b, 3 and 12) or may be achieved within a single computer if the storage units 8a, 8b and the client terminals 4a, 4b are hardware components stored in a single computer or software components executed in a single computer.

Each series of versions constitutes a log file and the function of a log file is to store the operations 14 and meta-data 24 making up the versions 16, 20.

In this embodiment, blocks are stored in the log files. The blocks are used to guarantee the atomic character of the operations and the acceptance of operations to create a version.

Figure 15:
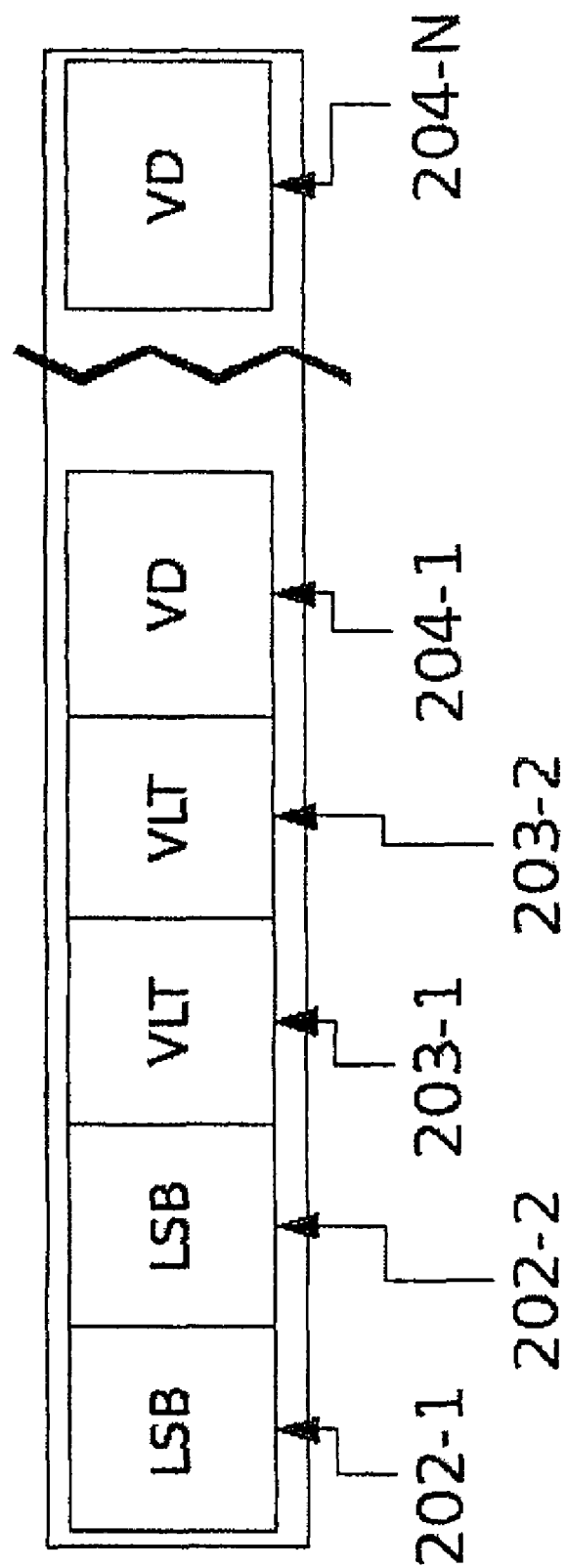
FIG. 15 illustrates the schematic structure of an embodiment of a log file as described in relation to FIG. 14.

FIG. 15 illustrates the structure of an embodiment of a log file as described in relation to FIG. 14. The different classes of data in the log file are illustrated.

Superblocks 202-1, 202-2 are stored in the log file. At least one of the superblocks is updated upon completion of an atomic process consisting in accepting operations 4 to create a derived version 16 or a further derived version 20.

Another set of pieces of data, identified with references 203-1, 203-2, are stored in the log file. These pieces of data 203-1, 203-2 include the meta-data 24 of a version and enable to obtain the information for reconstructing a version. These pieces of data 203-1, 203-2 code the mapping function, i.e. the function mapping the first addresses, the identifiers of the versions, and the second addresses, i.e. the identifiers of the locations of the basis version 12 and the operations 14 and/or antecedent versions 16, 20 required to reconstruct the actual state corresponding to the version. In one embodiment, these pieces of data 203-1, 203-2 constitute a block-level mapping function.

Furthermore, data 204-1, . . . , 204-N may be included in the log file entry for representing actual operations 14, which may be modifications made to a version 12, 16, 20.

Depending on the configuration, some of the data included in a log file entry, as described above, may be included, may not be included or may only partially be included. The actual operations 14 may for instance be stored at another location. The log file entries need not be stored in one single locations, but may instead be stored on several data storage units.

The invention may also be applied to object-based storage devices. In comparison to block devices, object-based storage devices raise the level of abstraction. Instead of presenting the abstraction of a logical array of blocks, addressed by their index in the array, an object store appears as a collection of objects, i.e. a collection of semantically meaningful data entity.

According to a further embodiment of the method of the invention, in the creating procedure S2, the one or more operations 14 are stored in one or more storage devices 8a, 8ab, 8ax, 8ay, wherein each one of the one or more storage devices 8a, 8ab, 8ax, 8ay is addressable on a block-by-block basis.

According to yet a further embodiment of the method of the invention, the derived version 16 includes data relating to the state of the data entity; and meta-data 24 relating to the mapping of the first addresses with the second addresses for providing access to S4 and reconstructing S42 the derived version 16.

According to yet a further embodiment of the method of the invention, at least one of the plurality of further derived versions 20 is created S6 by carrying out S62 one or more operations 14 on the derived version 16, by carrying out one or more operations 14 on another version 18 of the data entity, and by merging the one or more operations 14 carried out S62 on the derived version 16 and the one or more operations 14 carried out on the other version 18.

According to yet a further embodiment of the method of the invention, the step of carrying out S62 each one of the further one or more operations 14 on the derived version 16 of the data entity has an atomic nature, i.e. either an operation 14 is accepted or the operation 14 is not accepted and the data entity prior to said operation 14 is kept.

According to yet a further embodiment of the method of the invention, the further derived version 20 includes data relating to the state of the data entity; and meta-data 24 relating to the mapping of the first addresses with the second addresses for providing access to S8 and reconstructing S82 the further derived version 20.

According to yet a further embodiment of the method of the invention, the data and the meta-data 24 are physically stored at different locations.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Method for providing access to a data entity having a basis version, and for enabling the creation of derived versions of the data entity, comprising:
   a creating procedure for creating a derived version of the data entity by carrying out one or more operations on the basis version, intercepting the one or more operations carried out on the basis version, storing the one or more operations, and accepting the one or more operations to create the derived version; and a providing procedure for providing access to the derived version through first addresses mapped to second addresses of the basis version and of one or more operations equal to or equivalent in result to the accepted one or more operations, by reconstructing the derived version based on the basis version and the one or more operations equal to or equivalent in result to the accepted one or more operations; and further comprising:

a further creating procedure for creating a further derived version of the data entity by carrying out one or more operations on a derived version, intercepting the one or more operations carried out on the basis version, storing the one or more operations, and accepting the one or more operations to create the further derived version; and the providing procedure being further for providing access to the further derived version.

2. Method of claim 1, wherein the data entity comprises one or more pieces of data.

3. Method of claim 1, wherein, in the creating procedure, the one or more operations are stored in one or more storage devices.

4. Method according to claim 1, wherein a plurality of derived versions are each created by carrying out one or more operations on the basis version.

5. Method according to claim 4, wherein at least one of the plurality of derived versions is created by carrying out one or more operations on the basis version, by carrying out one or more operations on another version of the data entity, and by merging the one or more operations carried out on the basis version and the one or more operations on the other version.

6. Method according to claim 1, wherein the step of accepting the one or more operations to create the derived version has an atomic nature, i.e. either the one or more operations are all accepted, or the one or more operations are not accepted and the data entity is kept in the state preceding the one or more operations.

7. Method according to claim 1, wherein the step of carrying out each one of the one or more operations on the basis version has an atomic nature, i.e. either an operation is accepted, or the operation is not accepted and the state prior to said operation is kept.

8. Method according to claim 1, wherein a plurality of further derived versions are each created by carrying out one or more operations on the derived version.

9. Apparatus configured for providing access to a data entity having a basis version, and for enabling the creation of derived versions of the data entity, comprising:

a creating unit configured for creating a derived version of the data entity by carrying out one or more operations on the basis version, intercepting the one or more operations carried out on the basis version, storing the one or more operations, and accepting the one or more operations to create the derived version; and a providing unit configured for providing access to the derived version through first addresses mapped to second addresses of the basis version and of one or more operations equal to or equivalent in result to the accepted one or more operations, by reconstructing the derived version based on the basis version and the one or more operations equal to or equivalent in result to the accepted one or more operations; and further comprising:

a further creating unit configured for creating a further derived version of the data entity by carrying out one or more operations on a derived version, intercepting the one or more operations carried out on the basis version, storing the one or more operations, and accepting the one or more operations to create the further derived version; and the providing unit being further for providing access to the further derived version.

10. Apparatus of claim 9, wherein the data entity comprises one or more pieces of data.

11. Apparatus of claim 9, wherein the creating unit is further configured to create the derived version by storing the one or more operations in one or more storage devices.

12. Apparatus of claim 11, wherein each one of the one or more storage devices is addressable on a block-by-block basis.

13. Apparatus according to claim 9, wherein the creating unit is further configured for creating a plurality of derived versions each by carrying out one or more operations on the basis version.

14. Apparatus according to claim 13, wherein the creating unit is further configured for creating at least one of the plurality of derived versions by carrying out one or more operations on the basis version, by carrying out one or more operations on another version of the data entity, and by merging the one or more operations carried out on the basis version and the one or more operations carried out on the other version.

15. Apparatus according to claim 9, wherein the step of accepting the one or more operations to create the derived version has an atomic nature, i.e. either the one or more operations are all accepted, or the one or more operations are not accepted and the data entity is kept in the state preceding the one or more operations.

16. Apparatus according to claim 9, wherein the step of carrying out each one of the one or more operations on the basis version has an atomic nature, i.e. either an operation is accepted, or the operation is not accepted and the data entity prior to said operation is kept.

17. Apparatus according to claim 9, wherein the derived version includes data relating to the state of the data entity; and meta-data relating to the mapping of the first addresses with the second addresses for providing access to and reconstructing the derived version.

18. Apparatus of claim 17, wherein the data and the meta-data are physically stored at different locations.

19. Apparatus according to claim 9, wherein the further creating unit is further configured so that the plurality of further derived versions are each created by carrying out one or more operations on the derived version.

20. Apparatus according to claim 19, wherein the further creating unit is further configured so that at least one of the plurality of further derived versions is created
- by carrying out one or more operations on the derived version,
- by carrying out one or more operations on another version of the data entity, and
- by merging the one or more operations carried out on the derived version and the one or more operations carried out on the other version.

21. Apparatus according to claim 9, wherein the step of carrying out each one of the further one or more operations on the derived version of the data entity has an atomic nature, i.e. either
- an operation is accepted or
- the operation is not accepted and the data entity prior to said operation is kept.

22. Apparatus according to claim 9, wherein the further derived version includes
- data relating to the state of the data entity; and
- meta-data relating to the mapping of the first addresses with the second addresses for providing access to and reconstructing the derived version.

23. A computer-readable medium having thereon computer executable instructions for providing access to a data entity having a basis version, and for enabling the creation of derived versions of the data entity, the instructions for performing acts comprising:

a creating procedure for creating a derived version of the data entity by carrying out one or more operations on the basis version, intercepting the one or more operations carried out on the basis version, storing the one or more operations, and accepting the one or more operations to create the derived version; and a providing procedure for providing access to the derived version through first addresses mapped to second addresses of the basis version and of one or more operations equal to or equivalent in result to the accepted one or more operations, by reconstructing the derived version based on the basis version and the one or more operations equal to or equivalent in result to the accepted one or more operations; and further comprising:

a further creating procedure for creating a further derived version of the data entity by carrying out one or more operations on a derived version, intercepting the one or more operations carried out on the basis version, storing the one or more operations, and accepting the one or more operations to create the further derived version; and the providing procedure being further for providing access to the further derived version.

* * * * *